United States Patent
Hedde et al.

(10) Patent No.: US 11,385,451 B2
(45) Date of Patent: Jul. 12, 2022

(54) SELECTIVE PLANE ILLUMINATION IN THE CONVENTIONAL INVERTED MICROSCOPE GEOMETRY BY SIDE ILLUMINATION

(71) Applicant: The Regents of the University of California, Oakland, CA (US)

(72) Inventors: Per Niklas Hedde, Irvine, CA (US); Leonel Malacrida, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 242 days.

(21) Appl. No.: 16/483,659

(22) PCT Filed: Feb. 7, 2018

(86) PCT No.: PCT/US2018/017262
§ 371 (c)(1),
(2) Date: Aug. 5, 2019

(87) PCT Pub. No.: WO2018/148309
PCT Pub. Date: Aug. 16, 2018

(65) Prior Publication Data
US 2019/0353884 A1 Nov. 21, 2019

Related U.S. Application Data

(60) Provisional application No. 62/456,298, filed on Feb. 8, 2017.

(51) Int. Cl.
*G02B 21/06* (2006.01)
*G02B 21/08* (2006.01)
(Continued)

(52) U.S. Cl.
CPC ....... *G02B 21/082* (2013.01); *G01N 21/0303* (2013.01); *G01N 21/6408* (2013.01); *G01N 21/6458* (2013.01); *G02B 21/0088* (2013.01); *G02B 21/16* (2013.01); *G02B 21/26* (2013.01); *G02B 21/33* (2013.01); *G02B 21/367* (2013.01);
(Continued)

(58) Field of Classification Search
CPC .............. G02B 21/082; G02B 21/0088; G02B 21/16; G02B 21/26; G02B 21/33; G02B 21/367; G02B 21/00; G02B 21/0004; G02B 21/002; G02B 21/0032; G02B 21/0052; G02B 21/006; G02B 21/0076; G02B 21/34; G02B 21/36; G02B 21/361; G01N 21/0303; G01N 21/6408; G01N 21/6458;
(Continued)

(56) References Cited

U.S. PATENT DOCUMENTS

2015/0008339 A1* 1/2015 French ............... G01N 21/6486
250/458.1
2015/0211981 A1* 7/2015 Pampaloni ............ B01L 3/5082
250/453.11

(Continued)

*Primary Examiner* — Arnel C Lavarias
(74) *Attorney, Agent, or Firm* — Greer, Burns & Crain, Ltd.; Steven P. Fallon

(57) ABSTRACT

A sample imaging device includes a side illumination unit, a two window sample chamber, and refractive index matching. An optically transparent sample holder is in the sample well as is sample immersion fluid. The refractive index matching includes matching of the refractive index of material of a sample to be imaged.

18 Claims, 25 Drawing Sheets

(51) Int. Cl.
    *G01N 21/03*     (2006.01)
    *G01N 21/64*     (2006.01)
    *G02B 21/00*     (2006.01)
    *G02B 21/16*     (2006.01)
    *G02B 21/26*     (2006.01)
    *G02B 21/33*     (2006.01)
    *G02B 21/36*     (2006.01)
    *G01N 21/01*     (2006.01)

(52) U.S. Cl.
    CPC ............... *G01N 2021/0106* (2013.01); *G01N 2021/6482* (2013.01)

(58) Field of Classification Search
    CPC .............. G01N 2021/0106; G01N 2021/6482; G01N 2021/0307; G01N 2021/0389; G01N 21/64
    USPC ....... 359/385, 362, 363, 368, 369, 388, 390, 359/391, 396, 398; 356/244, 246
    See application file for complete search history.

(56) References Cited

U.S. PATENT DOCUMENTS

2018/0275389 A1\*   9/2018   Shepherd ............. G02B 21/025
2019/0056581 A1\*   2/2019   Tomer ................ G02B 21/0048

\* cited by examiner

Figure 10.

| Product | Cured RI @589nm | Cured RI @950nm | Viscosity cps | Elastic Modulus, mPs | % Elongation | Tensile Strength, mPs | Special Feature |
|---|---|---|---|---|---|---|---|
| MY-130 Series | UV curable (except as noted) for optical fibers | | | | | | |
| MY-133 | 1.336 | 1.336 | 700 | 4 | 12 | 0.4 | R/I identical to water / body tissue |
| MY-133 V-2000 | 1.333 | 1.329 | 2-3000 | 4.5 | 40 | 1.2 | Ideal for Vytran re-coating systems |
| MY-133 V-5000 | 1.344 | 1.34 | 4500 | 3.6 | 54 | 1.8 | Higher viscosity version |
| MY-133 MC | 1.33 | 1.325 | 400 | soft solid | | | Moisture Cure for large open surfaces, spin coating |
| MY-133 BA | 1.331 | 1.33 | 2800 | 4 | 45 | 1 | Improved adhesion to glass, especially in high humidity | http://www.eoc-inc.com/optical-coating-adhesive-encapsulants.htm

| Medium | n at 589 nm | T (C) |
|---|---|---|
| H2O millipore | 1.3334 | 21.7 |
| PBS 1x | 1.335 | 21.7 |
| TRIS 100 mM | 1.3361 | 21.8 |
| DMEM no phen red | 1.3353 | 21.9 |

Refractometer measurement at 589 nm

2-Photon (780 nm) Excitation of Rh110 Solution on Resin 1 pixel = 0.4 um
FWHM = 5 px = 2 um

1 um Beads in Agar on Top of Resin 1 pixel = 0.27 um
FOV 138 um 1 pixel = 0.27 um
FOV 100 um 3D Projection

SELECTIVE PLANE ILLUMINATION IN THE CONVENTIONAL INVERTED MICROSCOPE GEOMETRY BY SIDE ILLUMINATION

CROSS REFERENCE TO RELATED APPLICATIONS

This application is a National Phase of International Application No. PCT/US2018/17262, filed Feb. 7, 2018, which designated the U.S. and that International Application was published under PCT Article 21(2) in English. This application also includes a claim of priority under 35 U.S.C. § 119(e) to U.S. Provisional Application No. 62/456,198, filed Feb. 8, 2017, the entirety of which is hereby incorporated by reference.

FIELD OF THE INVENTION

The present disclosure relates to microscopy, specifically selective plane illumination microscopy.

BACKGROUND OF THE DISCLOSURE

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Selective plane illumination microscopy (SPIM) is suitable for fast, three-dimensional imaging. By confining the excitation light to a sheet, SPIM combines axial sectioning capability with minimal light exposure and fast, camera-based image acquisition. SPIM typically uses two (objective) lenses arranged perpendicular to each other. One lens is used for light detection, while the focal plane of that lens is illuminated with a sheet of light generated via the other lens. To generate the light sheet, cylindrical optics can be used. Alternatively, the beam can be rapidly scanned across the field of view of the detection lens to generate the sheet illumination. However, the arrangement of two objective lenses perpendicular to each other provides a number of challenges in terms of instrument design and sample geometry. For example, SPIM requires specific sample preparation, typically embedding the sample in a hydrogel such as agarose. This excludes the use of conventional sample mounts, such as coverslips, culture dishes and multi well plates.

To overcome this limitation, a popular approach is to dip into the sample container from the top, with both lenses typically at a 45° angle with respect to the sample plane. Such a system can be mounted on top of an inverted microscope or implemented as an independent instrument. The drawbacks of this geometry include the requirement of a large sample container to accommodate both lenses resulting in a large immersion volume. This can cause sample disturbance due to flow/convection and increases the amount of reagents needed. Further, there is no isolation of optics and sample which is problematic when dealing with hazardous samples (toxic, cancerous, infectious, etc.). Finally, since the observation plane is at an angle with respect to the sample container, the field of view for flat samples, such as a monolayer of cells, is limited, i.e., the full field of view of the detector cannot be utilized.

Thus there remains a need in the art for new devices and methods for devices and apparatuses with improved imaging capabilities.

SUMMARY OF THE DISCLOSURE

Various embodiments include a device comprising a side illumination unit, a two window sample chamber, and a refractive index matching. In another embodiment, the side illumination unit comprises components to generate a light sheet illuminating on a sample. In another embodiment, the two window sample chamber comprises two optically transparent windows perpendicular to each other. In another embodiment, the two window sample chamber further comprises a magnetic attachment to ensure easy to handle, stable, and reproducible mounting of a sample. In another embodiment, the refractive index matching comprises raising a sample in the two window sample chamber using an optically transparent material with a refractive index identical to the sample immersion fluid. In another embodiment, the refractive index matching allows imaging of flat samples such as a monolayer of cells. In another embodiment, the device is coupled with a microfluidic device. In another embodiment, the device is coupled with high throughput 3D imaging of multiple samples.

Other embodiments include a imaging apparatus comprising a microscope, and a device comprising a side illumination unit, a two window sample chamber, and a refractive index matching. In another embodiment, the apparatus is capable of imaging thick samples, such as cells, tissues, or small organisms embedded in a hydrogel. In another embodiment, the apparatus is capable of imaging a monolayer of cells. In another embodiment, the imaging apparatus further comprises a fluorescence lifetime measurement capability. In another embodiment, the side illumination unit comprises components to generate a light sheet illuminating on a sample. In another embodiment, the two window sample chamber comprises two optically transparent windows perpendicular to each other. In another embodiment, the two window sample chamber further comprises a magnetic attachment to ensure easy to handle, stable, and reproducible mounting of a sample. In another embodiment, the refractive index matching comprises raising a sample in the two window sample chamber using an optically transparent material with a refractive index identical to the sample immersion fluid. In another embodiment, the refractive index matching allows imaging of flat samples such as a monolayer of cells. In another embodiment, the observation plane is parallel to the sample surface, maximizing field of view for flat samples. In another embodiment, the microscope is an inverted or standard research microscope. In another embodiment, the imaging apparatus is coupled with a microfluidic device. In another embodiment, the imaging apparatus is coupled with high throughput 3D imaging of multiple samples.

Other embodiments include a method of imaging a sample comprising providing an apparatus comprising a microscope and a device comprising a side illumination unit, a two window sample chamber, and a refractive index matching, and imaging the sample in the apparatus. In another embodiment, the sample is a thick sample, such as cells, tissues, or small organisms embedded in a hydrogel. In another embodiment, the sample is a flat sample, such as a monolayer of cells. In another embodiment, no dipping into a container containing the sample is required to image the sample. In another embodiment, the imaging may be a video imaging. In another embodiment, the video image maps diffusion of molecular domains. In another embodiment, the imaging is a high throughput three-dimensional time course imaging.

Various embodiments include a method of improving an imaging device, comprising providing an imaging device, and illuminating a sample of the imaging device from the side with an accessory. In another embodiment, the imaging device is a microscope. In another embodiment, the imaging device is a standard research or regular inverted microscope. In another embodiment, the accessory comprises a side illumination unit. In another embodiment, the accessory comprises a side illumination unit, a two window sample chamber, and a refractive index matching.

Other features and advantages of the invention will become apparent from the following detailed description, taken in conjunction with the accompanying drawings, which illustrate, by way of example, various embodiments of the invention.

DESCRIPTION OF THE DRAWINGS

Exemplary embodiments are illustrated in referenced figures. It is intended that the embodiments and figures disclosed herein are to be considered illustrative rather than restrictive.

FIG. 10 depicts, in accordance with embodiments herein, overview of the refractive index of commercially available, UV curable resins and common sample immersion media.

FIG. 24(A) shows the distortion of the light sheet can be minimized by supporting the sample with a material of refractive index similar to the surrounding medium. FIG. 24(B) Excitation light path without (top) and with refractive index mismatch (bottom), the insets show the corresponding diffraction patterns at the focus. FIG. 24(C) Intensity profile of the illumination beam at the focus along x direction for index mismatches of 0-0.5% (NA 0.3, 1 mm depth, 500 nm light). FIG. 24(D) Beam waist (e−2) at the focus and Strehl ratio plotted as a function of the refractive index mismatch, the inset shows the diffraction pattern at 0.3% mismatch where the maximum intensity has shifted to the periphery of the light sheet as indicated by the arrows.

DETAILED DESCRIPTION

Figure 1:
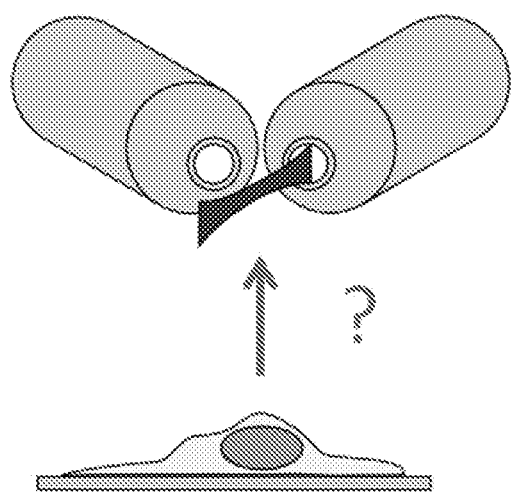
FIG. 1 depicts, in accordance with embodiments herein, horizontal SPIM, which excludes the use of samples prepared on cover slips and in dishes/multi well plates.

All references, publications, and patents cited herein are incorporated by reference in their entirety as though they are fully set forth. Unless defined otherwise, technical and scientific terms used herein have the same meaning as commonly understood by one of ordinary skill in the art to which this invention belongs. Hornyak, et al., Introduction to Nanoscience and Nanotechnology, CRC Press (2008); Singleton et al., Dictionary of Microbiology and Molecular Biology 3rd ed., J. Wiley & Sons (New York, N.Y. 2001); March, Advanced Organic Chemistry Reactions, Mechanisms and Structure 7th ed., J. Wiley & Sons (New York, N.Y. 2013); and Sambrook and Russel, Molecular Cloning: A Laboratory Manual 4th ed., Cold Spring Harbor Laboratory Press (Cold Spring Harbor, N.Y. 2012), provide one skilled in the art with a general guide to many of the terms used in the present application. One skilled in the art will recognize many methods and materials similar or equivalent to those described herein, which could be used in the practice of the present invention. Indeed, the present invention is in no way limited to the methods and materials described.

As described herein, and in accordance with the various embodiments herein, the inventors have disclosed a novel apparatus illustrating selective plane illumination in the conventional sample geometry. The new design is uses a novel accessory along with a regular inverted microscope, wherein the sample is illuminated from the side by the accessory. A custom designed chamber with multiple wells featuring two optically transparent windows is used to allow side illumination and light detection from the bottom. This way, all microscope ports remain available for other purposes. Also, there is unrestricted access from the top which can be used, for example, to fit the connections of a microfluidic device. Without the need of dipping into the sample container, smaller sample volumes (<1 ml) can be realized and the use of high NA lenses is facilitated. Still, all kinds of samples can be used including both, flat samples such as monolayers of cells or bacteria on a surface and specimen such as cells, tissues and organisms embedded in hydrogels. Distortion-free imaging of flat samples is achieved via matching of the refractive index. Also, isolation of optics and sample allows imaging of sealed sample containers when demanded, e.g., for samples treated with potent toxins. Further, in this design, the orientation of the imaging plane is parallel to the surface of the sample container which is desirable for flat samples where it maximizes the field of view. Finally, since the observation well volume can be very small, high throughput 3D imaging of multiple wells is possible.

In one embodiment, the present disclosure provides a device comprising a side illumination unit, a two window sample chamber, and a refractive index matching. In one embodiment, the side illumination unit comprises components to generate a light sheet illuminating on a sample. In one embodiment, the two window sample chamber comprises two optically transparent windows perpendicular to each other. In one embodiment, the two window sample chamber further comprises a magnetic attachment to ensure easy to handle, stable, and reproducible mounting of a sample. In one embodiment, the refractive index matching comprises raising a sample in the two window sample chamber using an optically transparent material with a refractive index identical to the sample immersion fluid. In one embodiment, the refractive index matching allows imaging of flat samples such as a monolayer of cells.

In another embodiment, the present disclosure provides an imaging apparatus comprising (a) a microscope and (b) a device comprising a side illumination unit, a two window sample chamber, and a refractive index matching. In one embodiment, the apparatus is capable of imaging thick samples, such as cells, tissues, or small organisms embedded in a hydrogel. In one embodiment, the apparatus is capable of imaging a monolayer of cells. In one embodiment, the apparatus further comprises a fluorescence lifetime measurement capability. In one embodiment, the side illumination unit comprises components to generate a light sheet illuminating on a sample. In one embodiment, the two window sample chamber comprises two optically transparent windows perpendicular to each other. In one embodiment, the two window sample chamber further comprises a magnetic attachment to ensure easy to handle, stable, and reproducible mounting of a sample. In one embodiment, the refractive index matching comprises raising a sample in the two window sample chamber using an optically transparent material with a refractive index identical to the sample immersion fluid. In one embodiment, the refractive index matching allows imaging of flat samples such as a monolayer of cells. In one embodiment, the observation plane is parallel to the sample surface, maximizing field of view for flat samples.

In another embodiment, the present disclosure provides a method of imaging a sample comprising providing an apparatus comprising a microscope and a device comprising a side illumination unit, a two window sample chamber, and a refractive index matching; and imaging the sample in the apparatus. In one embodiment, the sample is a thick sample, such as cells, tissues, or small organisms embedded in a hydrogel. In one embodiment, the sample is a flat sample, such as a monolayer of cells. In one embodiment, no dipping into a container containing the sample is required to image the sample. In one embodiment, the imaging may be a video imaging. In one embodiment, the video image maps diffusion of molecular domains. In one embodiment, the imaging is a high throughput three-dimensional time course imaging.

To reduce cost and complexity while maximizing flexibility, it is highly desirable to implement a new imaging technology such that it can be added to a standard research microscope. While doing so, all of the previous functionality should be maintained and modifications to the existing system should be kept to a minimum. At the same time, the implementation should be able to take full advantage of the employed technology. Additionally, sample handling should be compatible with established methods and operation of the system should not require labor intensive adjustments. Previously described selective plane illumination microscopy techniques typically compromise at least one of those parameters, e.g., spatial resolution is sacrificed to simplify sample handling or vice versa. In one embodiment, the inventors have disclosed herein a new technology termed sideSPIM that meets all requirements simultaneously while also offering new applications of SPIM towards microfluidics and high throughput 3D imaging of multiple samples.

Embodiments of the present disclosure are further described in the following examples. The examples are merely illustrative and do not in any way limit the scope of the invention as claimed.

EXAMPLES

Example 1

Generally

Selective plane illumination microscopy (SPIM) is one of the most suitable techniques for fast, three-dimensional imaging. By confining the excitation light to a sheet, SPIM combines axial sectioning capability with minimal light exposure and fast, camera-based image acquisition. SPIM typically uses two (objective) lenses arranged perpendicular to each other. One lens is used for light detection, while the focal plane of that lens is illuminated with a sheet of light generated via the other lens. To generate the light sheet, cylindrical optics can be used. Alternatively, the beam can be rapidly scanned across the field of view of the detection lens to generate the sheet illumination. However, the arrangement of two objective lenses perpendicular to each other provides a number of challenges in terms of instrument design and sample geometry as explained in the following.

Initially SPIM was designed around the specimen with excitation and detection in the horizontal plane. This requires specific sample preparation, typically embedding the sample in a hydrogel such as agarose. This excludes the use of conventional sample mounts, such as coverslips, culture dishes and multi well plates as illustrated in FIG. 1.

Figure 2:
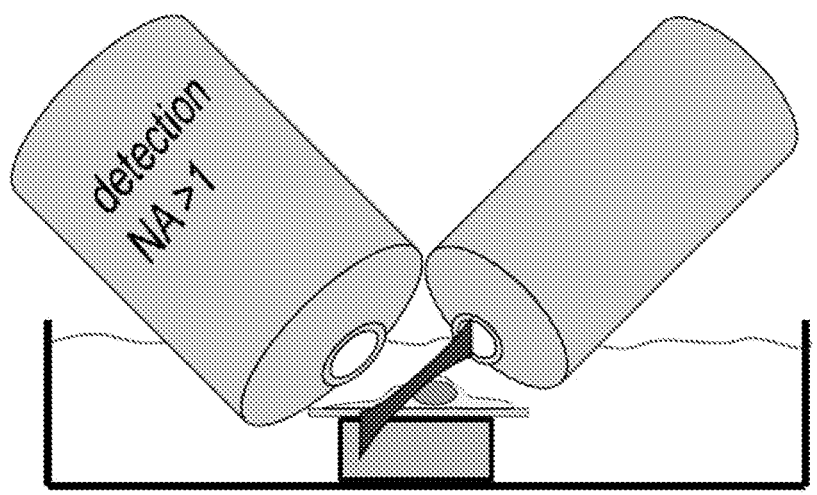
FIG. 2 depicts, in accordance with embodiments herein, inverted or upright SPIM with lenses of high numerical aperture is possible by raising the specimen into the gap between the two objective lenses.

To overcome this limitation, a popular approach is to dip into the sample container from the top, with both lenses typically but not necessarily at a 45° angle with respect to the sample plane. Such a system can be mounted on top of an inverted microscope or implemented as an independent instrument. In this configuration, the objectives are immersed in the same fluid as the sample, which in most cases is either air or water. With water dipping lenses, a numerical aperture (NA) of up to 0.8 can be utilized. Lenses of higher NA can be used by raising the sample into the gap between the two lenses (see FIG. 2).

This large NA lens allows the application of fluorescence fluctuation methods. The drawbacks of this geometry include the requirement of a large sample container to accommodate both lenses resulting in a large immersion volume. This can cause sample disturbance due to flow/convection and increases the amount of reagents needed. Further, there is no isolation of optics and sample which is problematic when dealing with hazardous samples (toxic, cancerous, infectious, etc.). Also, dipping into the sample container from the top limits access from that direction. This makes it difficult to fit devices for sample support and monitoring such as incubators, microfluidic devices, electrodes, brightfield illumination, etc. Finally, since the observation plane is at an angle with respect to the sample container, the field of view for flat samples, such as a monolayer of cells, is limited, i.e., the full field of view of the detector cannot be utilized. Another approach to using high NA lenses is reflected light sheet microscopy, in which the light sheet is generated by reflecting a beam incident from the top by 45° with a small mirror mounted on an atomic force microscope cantilever. With this approach, the light sheet is parallel to the sample plane, hence, for flat samples such as a cell monolayer, the full field of view of the detector can be utilized. However, this method requires precise positioning of the mirror very close to the sample. Also, the mirror as well as the excitation lens are introduced from the top and dipped into the sample container, again limiting access and prohibiting sample isolation. Also, chemicals present in the immersion fluid can degrade the mirror so it has to be replaced regularly. Finally, objects very close (<2 μm) to the bottom of the sample container, such as the bottom membrane of a cell, cannot be imaged in this configuration. Alternatively, high NA detection can be realized via a prism-coupled light-sheet condenser design that redirects the light sheet horizontally onto a sample at the focal plane of an imaging objective. The lack of a cantilever facilitates sample handling and operation of the system. However, the sample container is tilted at a horizontal angle of approximately 20°, so care has to be taken when filling the sample dish with the immersion fluid. Again this design demands open access from the top with the same drawbacks as mentioned before. A design that allows access from the top uses a water prism that compensates for aberrations introduced when illumination and imaging from the bottom at an angle through a coverglass. However, this solution cannot be mounted on a regular inverted microscope due to size constraints. Also, this configuration does contain additional sources of aberration, primarily due to imaging through a tilted coverslip. Hence, it is more suitable for low resolution imaging. Another design integrates a sample cuvette with side illumination into a stage inset of an inverted microscope. While this approach is compact and low cost, it provides relatively low axial resolution (>5 μm) and demands specific FEP tube-mounted samples. Finally, SPIM implementations using a single lens do not suffer from opto-mechanical constraints of two lens designs but are limited in spatial resolution and/or imaging depth.

Example 2

Components of SideSPIM

In one embodiment, the three key components of the sideSPIM include:

1) Side illumination unit. All optical components required to generate the light sheet illuminating the sample are mounted onto a single platform. This unit can be coupled to any inverted microscope.

2) Two window sample chamber. With two optically transparent windows perpendicular to each other, the light to generate the sheet illumination at the sample plane can be introduced from the side. Magnetic attachment of the chamber to the microscope stage ensures easy to handle, stable and reproducible mounting.

3) Refractive index matching. By raising the sample inside the chamber well using an optically transparent material with a refractive index identical to the sample immersion fluid, samples can be imaged distortion free all the way to the bottom. Index matching also allows imaging of flat samples such as a monolayer of cells in the first place.

Example 3

Side Illumination Unit

Figure 3:
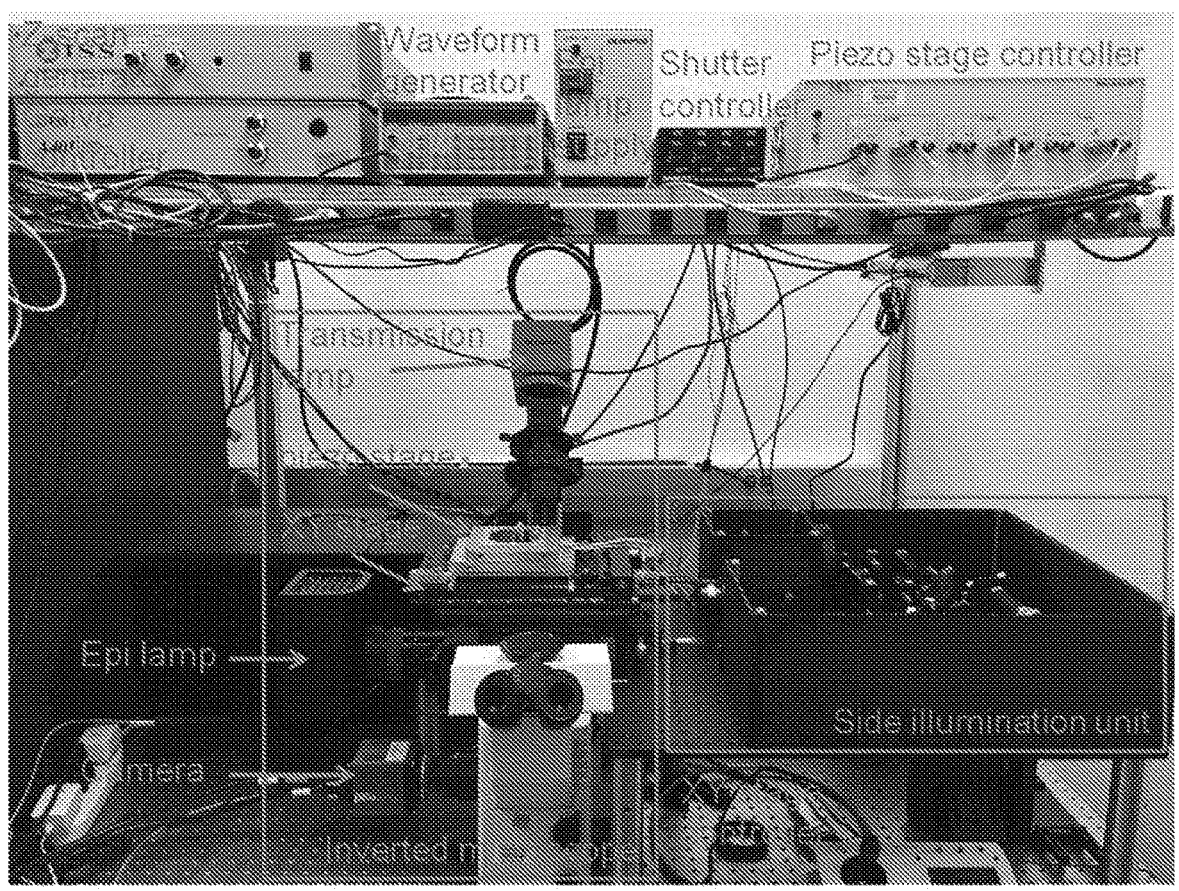
FIG. 3 depicts, in accordance with embodiments herein, one embodiment of sideSPIM system. On the left the conventional inverted microscope configuration can be seen, joined by the side illumination unit on the right. The sample holder is mounted to the microscope stage
Figure 4:
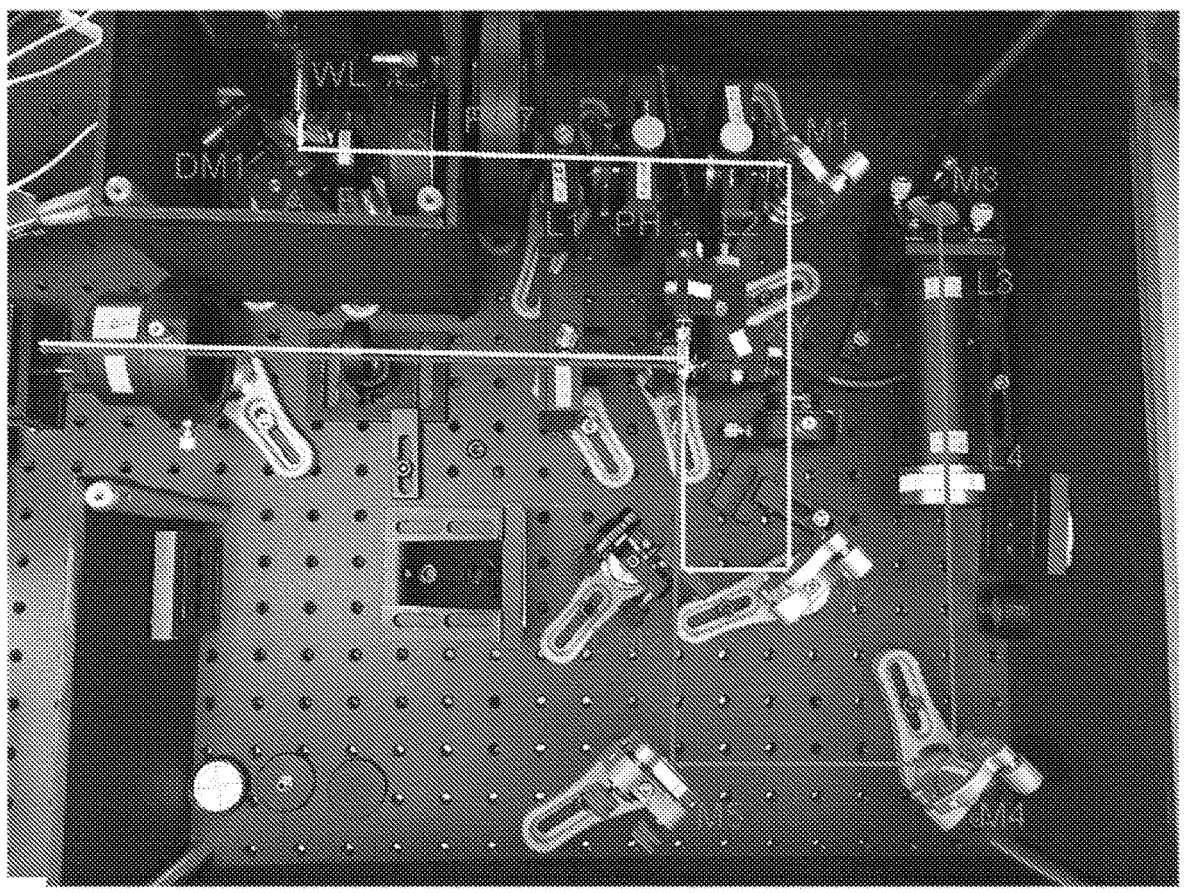
FIG. 4 depicts, in accordance with embodiments herein, one embodiment of the side illumination unit that generates the light sheet.

One embodiment of the sideSPIM prototype is illustrated in FIG. 3. The system is based on an inverted microscope (IX71 fitted with epifluorescence illumination unit, Olympus) with camera detection (Edge 4.2, PCO). A motorized xy stage (MS-2000, ASI) holds a piezo xyz-stage (NANO-PDQ375, Mad City Labs) fitted with a custom magnetic sample holder inset. The stage assembly is raised by 36 mm using spacers to make room for the objective lens of the side illumination unit located on the left. Besides being installed onto the same flat and rigid mounting surface (Smart Table UT2, Newport), no further mechanical connections from to side illumination unit to the microscope body are required. A more detailed view of the side illumination assembly is shown in FIG. 4.

Figure 5:
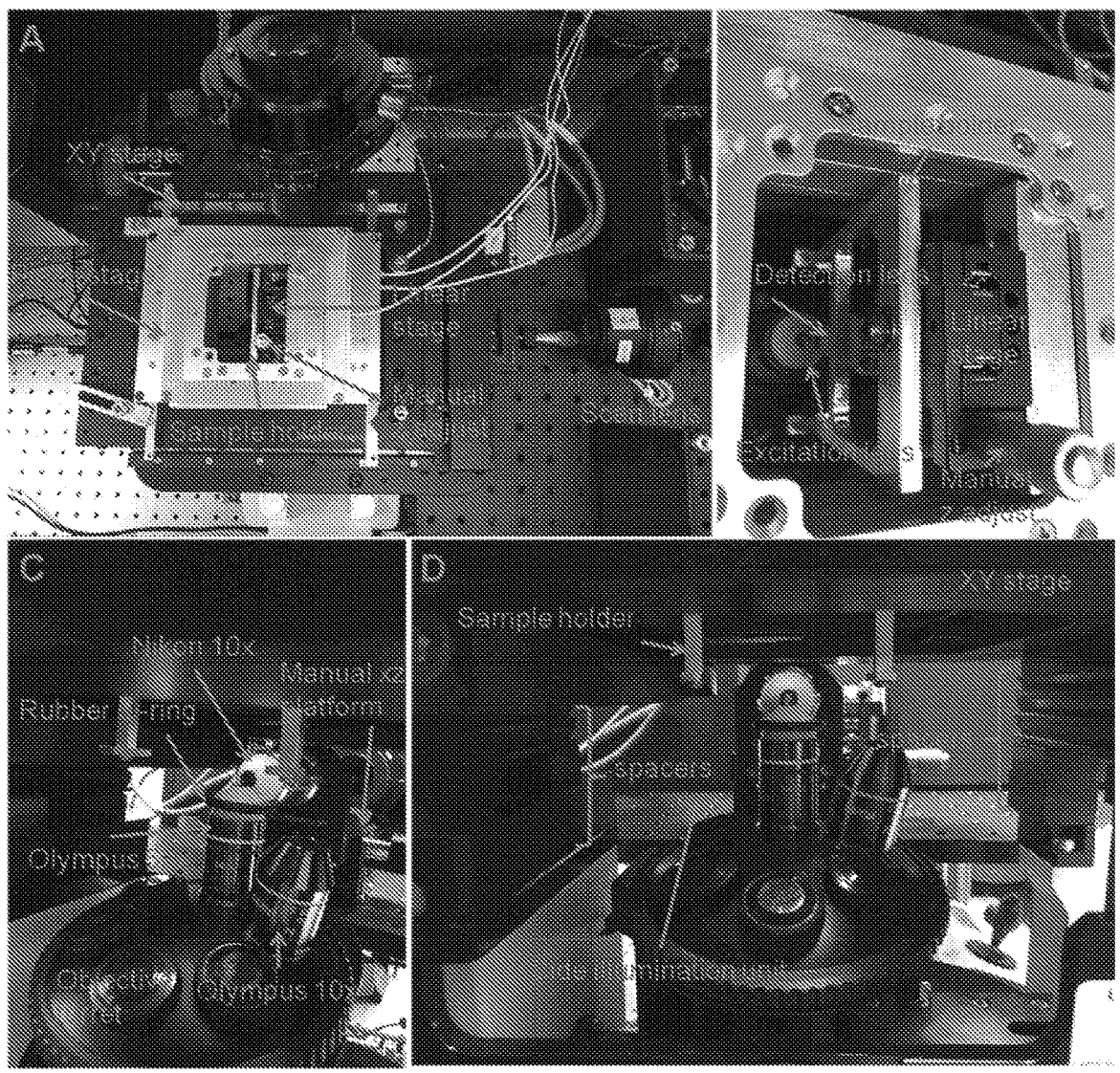
FIG. 5 depicts, in accordance with embodiments herein, one embodiment of the arrangement of excitation lens, detection lens and sample holder. (A) Top view of microscope stage and sample holder. (B) Custom sample holder mounted to the piezo stage. (C) Side view of the excitation/detection lens arrangement. (D) View from the left showing spacers to raise the microscope stage.

With this unit, the light sheet is generated and injected into the sample. The assembly consists of a white laser source, WL (SC 390, Fianium), for excitation with visible light. From the fiber output the light is reflected of a dichroic mirror, DM1 (LP670), and passed through a short pass filter, F1 (SP680), to remove the near IR portion of the laser output which is directed onto an absorber, A (LB1, Thorlabs). The visible portion is passed through a shutter, S (LS3, Uniblitz), followed by a motorized filter wheel, F2-7 (FW102C, Thorlabs), containing six different filters (440/40 nm, 480/30 nm, 535/30 nm, 572/15 nm, 633/10 nm and ND3) which define the excitation wavelength band. To ensure a Gaussian beam profile the filter wheel is followed by a spatial filter. In the spatial filter, the laser beam is focused onto a 10 μm pinhole, PH (P10S, Thorlabs), via a lens of 30 mm focal length, L1 (AC254-030-A, Thorlabs), and collimated by a lens of 50 mm focal length, L2 (AC254-050-A, Thorlabs). Redirected with a mirror, M1, the beam is then passed through an adjustable iris, I (SM1D12, Thorlabs), to control the beam diameter. Reflected off a second mirror, M2, and a long pass dichroic mirror, DM2 (LP670), the beam is redirected onto the scanning mirror assembly, XY (A402, ISS). In addition, a pulsed tunable Ti:Sa laser (Chameleon Ultra, Coherent) for two-photon excitation located behind the sideSPIM setup on the same optical table is free space coupled into the side illumination unit from the bottom. The laser intensity is modulated by an acousto optic modulator (AOM, AA Opto Electronic) placed immediately after the laser output. After directing the beam to the illumination unit via four mirrors on the optical table it is reflected off a mirror, M3, and collimated by a telescope consisting of two lenses of 50 mm focal length, L3 and L4 (AC254-050-B, Thorlabs). Via two more mirrors, M4 and M5, the Ti:Sa beam is passed through the same long pass dichroic mirror, DM2 (LP670), to be joined with the visible laser light. The combined beam is then relayed towards the excitation objective (10× CFI Plan Fluorite NA 0.3, Nikon) via a scan lens, SL (#49-356, Edmund Optics), and a tube lens, TL (180 mm, Olympus). Rapid scanning of the horizontal axis results in the generation of a light sheet in the plane of the detection lens. Alternatively, instead of scanning the beam, cylindrical optics could be used to generate the sheet. The scanning, however, facilitates two-photon excitation and has the advantage that non-Gaussian beam profiles could be generated. The light generated in the sample is collected by the detection lens and, after passing through the internal tube lens and fluorescence filters (DAPI, GFP and TexasRed filter sets and a 650 nm long pass filter) of the inverted microscope, imaged onto the CMOS camera (Edge 4.2, PCO) mounted to the left side port of the microscope. Hence fluorescence is collected the same way as with conventional epi-illumination through the backport. Brightfield illumination is possible via the lamp and condenser arrangement mounted on top. The right side port of the microscope is still available and could be fitted with another excitation/detection system. Any combinations of excitation and detection lens can be used, with the only restriction that the focal points of the two lenses have to overlap without mechanical collision of the two lenses. Photographs of the objective lens arrangement and the sample holder is shown in FIG. 5. Panel (A) shows a top view of the microscope stage with the sample holder, on the left, the tube lens from the side illumination unit can be seen. A piezo xyz-stage (NANO-PDQ375, Mad City Labs) is mounted on top of a motorized xy stage (MS-2000, ASI). The inset of the piezo stage is fitted with the custom sample holder, as can be seen in panel (B). It consists of a vertically mounted linear stage (MS1S, Thorlabs) onto which the actual sample holder is mounted to. The linear stage allows for manual adjustment of the sample z position. Panels (C) and (D) show the objective lens configuration. The detection lens (LUMPLFLN60x/W NA 1.0, Olympus) is located in the turret that is part of the inverted microscope. Hence, detection lenses can be easily changed by rotation of the turret, if different magnifications are required for image acquisition. In one illustrative prototype a 10×NA 0.3 water dipping lens was used for excitation (10× CFI Plan Fluorite NA 0.3, Nikon), and switch between a 10×NA 0.3 air objective (10× Plan Fluorite Objective NA 0.3, Olympus) and the 60×NA 1.0 water dipping lens in detection depending on the resolution/field of view demanded. A rubber O-ring is utilized to stop water from flowing down the 60×NA 1.0 water dipping lens. The excitation lens is mounted on an xz manual platform (MT1, Thorlabs) attached to the illumination unit to align the light sheet with the optical axis of the detection lens. The microscope turret z-drive is then utilized to align the focal plane of the detection lens with the light sheet. The stage assembly is raised by 36 mm using aluminum spacers to make room underneath the motorized xy stage for the objective lens of the side illumination unit.

Figure 6:
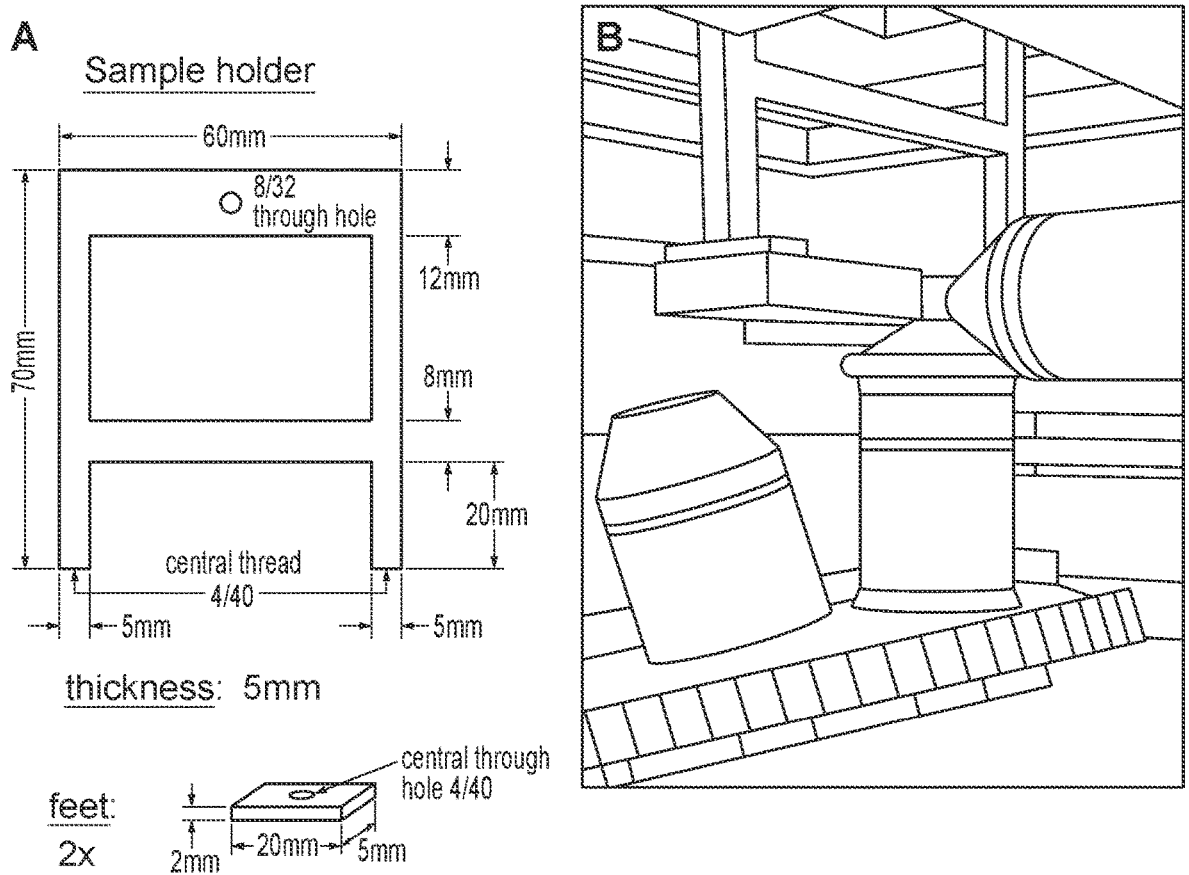
FIG. 6 depicts, in accordance with embodiments herein, (A) drawing of the sample holder including dimensions. (B) chamber snapped to sample holder in the sideSPIM.

Three-dimensional imaging is achieved by scanning the sample in axial direction with the piezo z-stage inset. The sample holder is machined from aluminum, its t-shaped legs hold four magnets, one in each corner, to ensure easy and secure sample attachment. A sketch of the sample holder is shown in FIG. 6 (A). The screws that attach the legs to the frame also act as pins that fit into corresponding holes (5 mm diameter) in the sample chamber. Panel (B) displays how the chamber attaches to the sample holder.

Example 4

Two Window Sample Chamber

Figure 7:
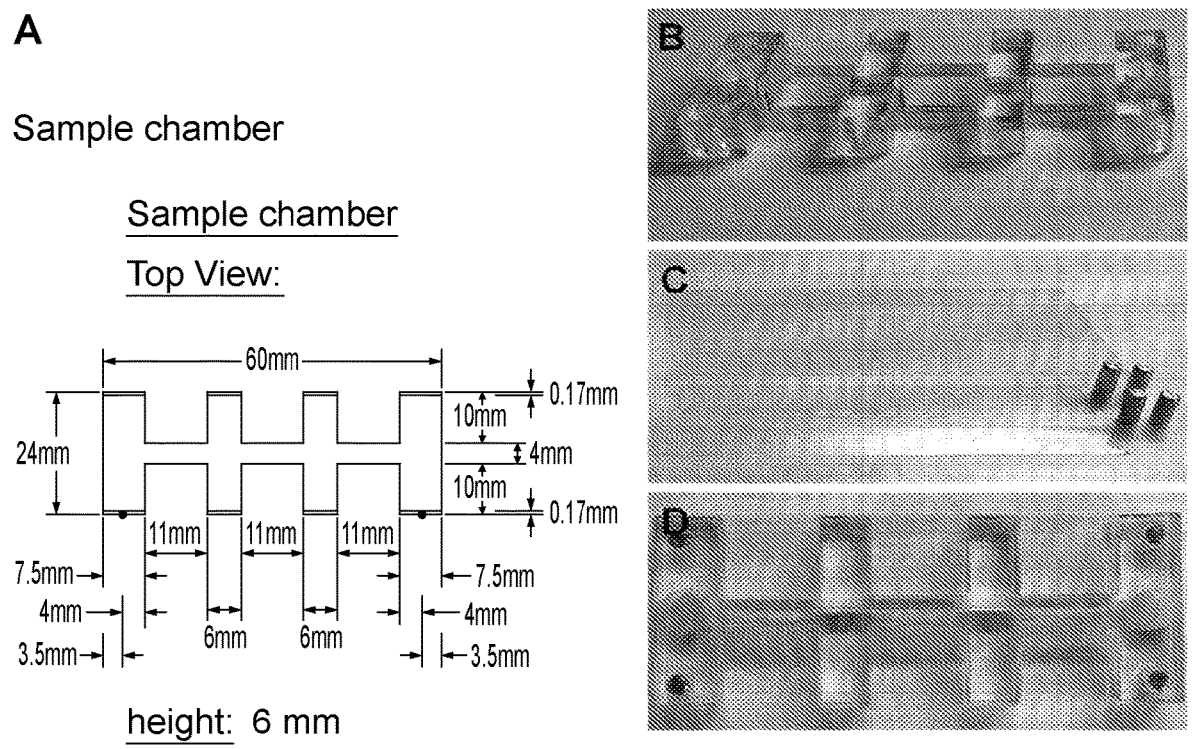
FIG. 7 depicts, in accordance with embodiments herein, (A) drawing of sample chamber including dimensions. (B) sample chamber backbone laser-cut from 6 mm thick plastic. (C) bottom glass, side glass and four steel pins that attach to the chamber backbone. (D) fully assembled chamber.

In order to inject the light sheet into the sample from the side with the side illumination unit, the sample chamber needs to have two optically transparent windows, one on the bottom and one on the side of each well. A sketch of one embodiment of the sample chamber design including dimensions is shown in FIG. 7A. The first prototype was machined from aluminum or 6 mm thick plastic. Three pieces of glass were then attached to create the chamber wells, one on the bottom and two on the sides of the chamber backbone. For the bottom, commercially available cover glass measuring 60 mm×24 mm of 0.17 mm thickness (22266882, Fisherbrand) was used. The two side windows (52 mm×6 mm) were cut from the same cover glass slides using an engraving pen (Z225568-1EA, Sigma). Watertight attachment was achieved by means of an UV curable optical adhesive (NOA60, Thorlabs). Finally, four steel pins were glued into holes pre-drilled during the laser-cutting process on the corners to allow the chamber to attach to the four magnets embedded in the feet of the sample holder. A photograph of the raw material is shown in panel (B, C), while panel (D) displays a picture of the fully assembled chamber.

Figure 8:
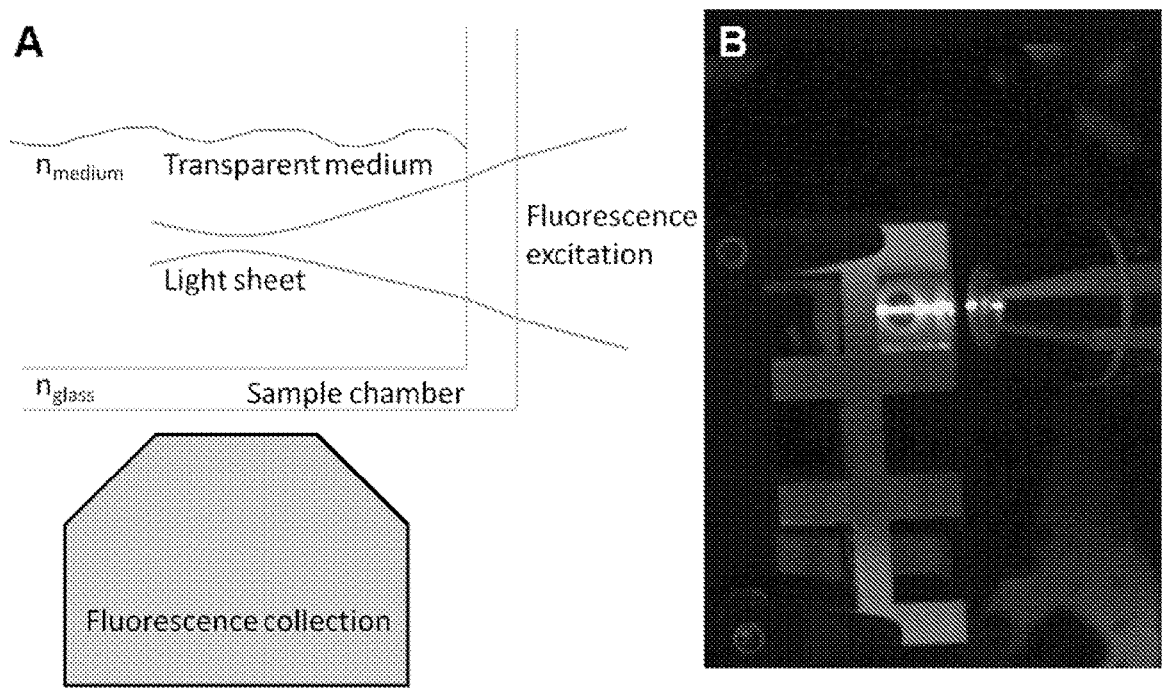
FIG. 8 depicts, in accordance with embodiments herein, (A) principle of SPIM via side illumination illustrated for solutions or cells mounted in a hydrogel. (B) photograph of the light sheet generated in the earlier aluminum prototype sample chamber with an excitation NA of 0.3.

The exact dimensions are not critical for the function of the system and can be adopted to optimally accommodate the sample under study. Especially, since the well size can be very small, a large number of wells can be arranged in a line to allow for high throughput imaging. Each well can be addressed in an automated way by movement of the sample chamber with the motorized stage. The only requirements of the design are two thin, optically transparent windows, one on the bottom and one on the side. For the prototype, microscope cover glass of 0.17 mm thickness was used, however other transparent materials would work as well. For samples embedded in a transparent medium there are no further requirements for imaging. FIG. 8A illustrates how the light sheet is generated in the sample. One well of the chamber was filled with a 100 nM solution of the fluorescent dye Rhodamine 110. Panel (B) shows the light sheet generated by excitation with blue light (480 nm).

The only change in refractive index occurs at the transition between window and mounting medium. Since this transition occurred perpendicular to the optical axis, there were no significant optical aberrations. This was demonstrated with a solution of the fluorescent dye Rhodamine 110, an image of the light sheet can be seen in FIG. 7, right panel. It has to be noted, however, that as soon as a significant amount of light passes through a material of different refractive index, e.g., when trying to image an object close to the bottom of the sample chamber, optical aberrations occur. This can be avoided by matching of the refractive index.

Example 5

Refractive Index Matching

Figure 9:
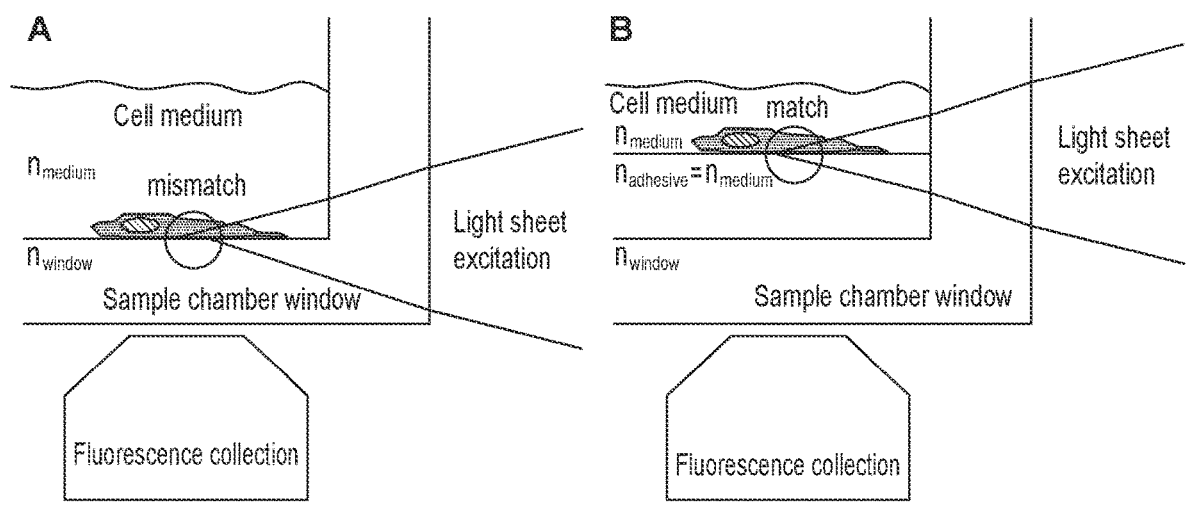
FIG. 9 depicts, in accordance with embodiments herein, (A) if a significant portion of the beam passes through a material of different refractive index, optical aberrations occur resulting in a distorted light sheet. (B) by mounting the sample on top of a material of the same refractive index as the surrounding medium, an index change and, hence, aberrations can be avoided.

While in solution or in a hydrogel (e.g. agarose, collagen, gelatin, etc.) the mismatch in refractive index between the bottom window of the chamber and the sample mounting medium can be avoided by imaging in the center of the mounting medium (see FIG. 8A), imaging a monolayer of cells or bacteria on a surface represents exactly such problem (FIG. 9A). However, a mismatch can be avoided if the flat sample is mounted on top of an optically transparent material with a refractive index that is the same as the surrounding medium (FIG. 9B).

With an excitation NA of 0.3 and a desired imaging depth of 1 mm, the mismatch in refractive index should be less than 0.1%. Such material is commercially available, e.g., in the form of an UV curable resin (MY-133, EOC-Inc), a selection of suitable materials is shown in FIG. 10.

The resin between two glass slides was cured to achieve a flat surface with the desired thickness. After curing, the resin is cut to size and transferred into the sample chamber, as illustrated in FIG. 11A-D.

Figure 11:
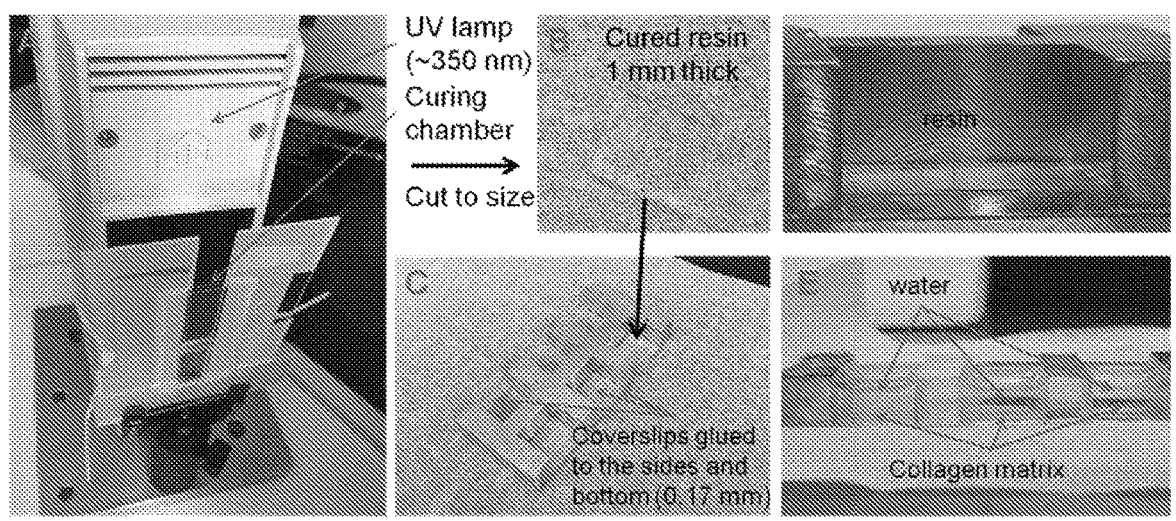
FIG. 11 depicts, in accordance with embodiments herein, the resin is filled between to glass slides spaced at the desired distance, here 1 mm (A). After curing with a UV source, the resin is cut to size (B) and transferred into the sample chamber (C). A closeup image of the resin in the chamber well is shown in (D). Instead of the resin, a collagen hydrogel can also be used (E).

Samples such as single cells can be grown on the resin followed by SPIM imaging with side illumination. Other samples that do not require culture such as giant unilamellar vesicles (GUVs) can simply be transferred into the sample chamber containing the resin for immediate imaging. Alternatively, hydrogels with a refractive index very close to water can be used as substrate as well. FIG. 11E shows 1 mm thick layers of collagen inside three chamber wells, the pink color comes from the pH indicator Phenol red that was mixed with the collagen to facilitate pH adjustment.

Example 6

Prototype, without Index Matching

Figure 12:
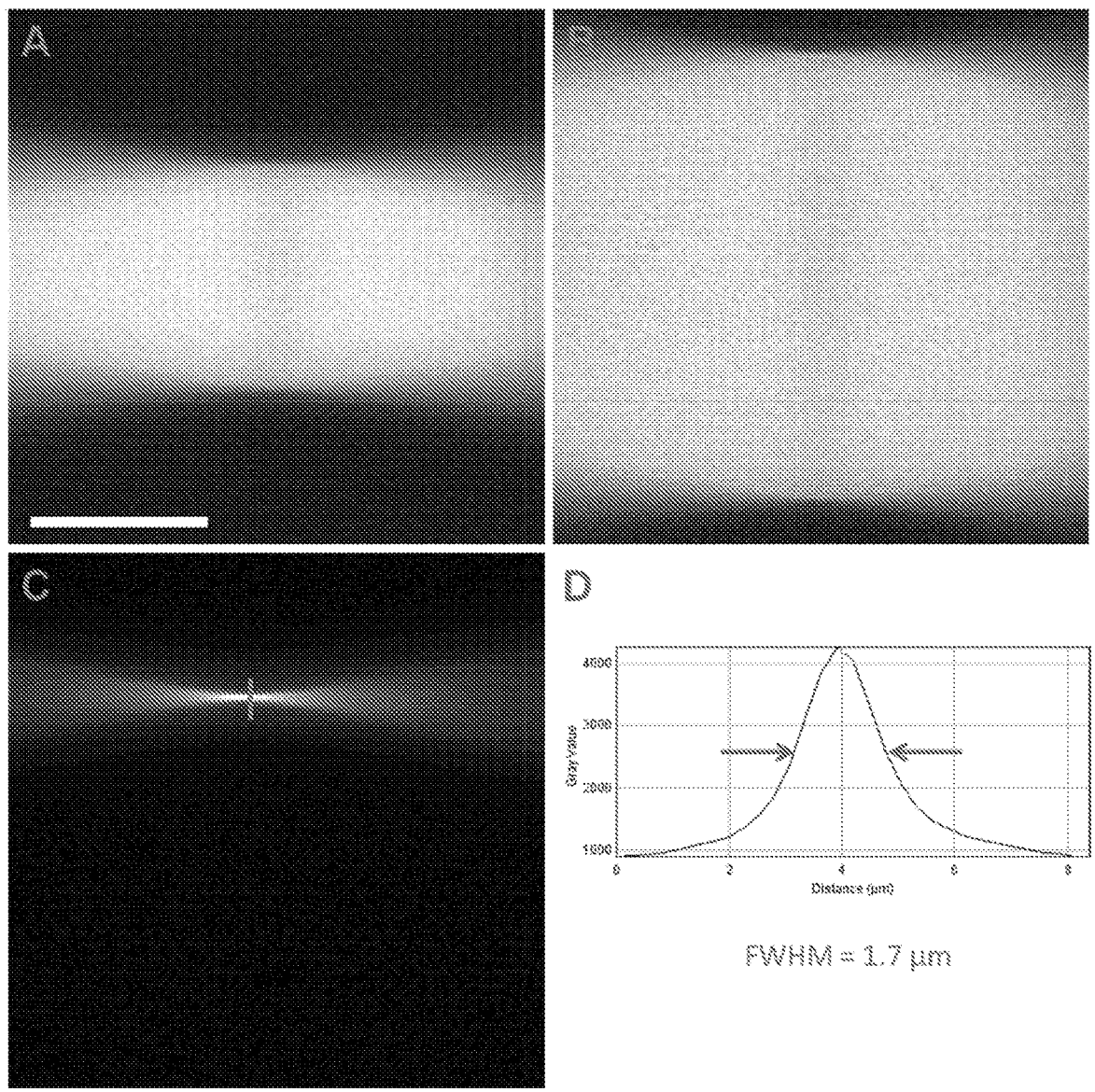
FIG. 12 depicts, in accordance with embodiments herein, Light sheet in a solution of Rhodamine 110. Light sheet at a scan amplitude of 0.1 V (A) and 0.2 V (B). (C) Fluorescence image of the beam at 0 V scan amplitude. (D) Cross section of the beam. Scale bar, 40 µm.

The inventors have built a working prototype and performed several measurements to test the capabilities. To test the system, a 100 nM solution of Rhodamine-110 was imaged. Fluorescence was excited in a band of 465-495 nm (100 µW before the excitation objective) and detected through a 535/50 nm band pass filter. The extension of the light sheet in the plane of excitation is defined by the scanning signal amplitude. FIG. 12 shows the fluorescence signal from the Rhodamine 110 solution using scanning amplitudes of 0.1 V (A) and 0.2 V (B), both acquired with the Olympus 60×NA 1.0 detection lens.

Figure 13:
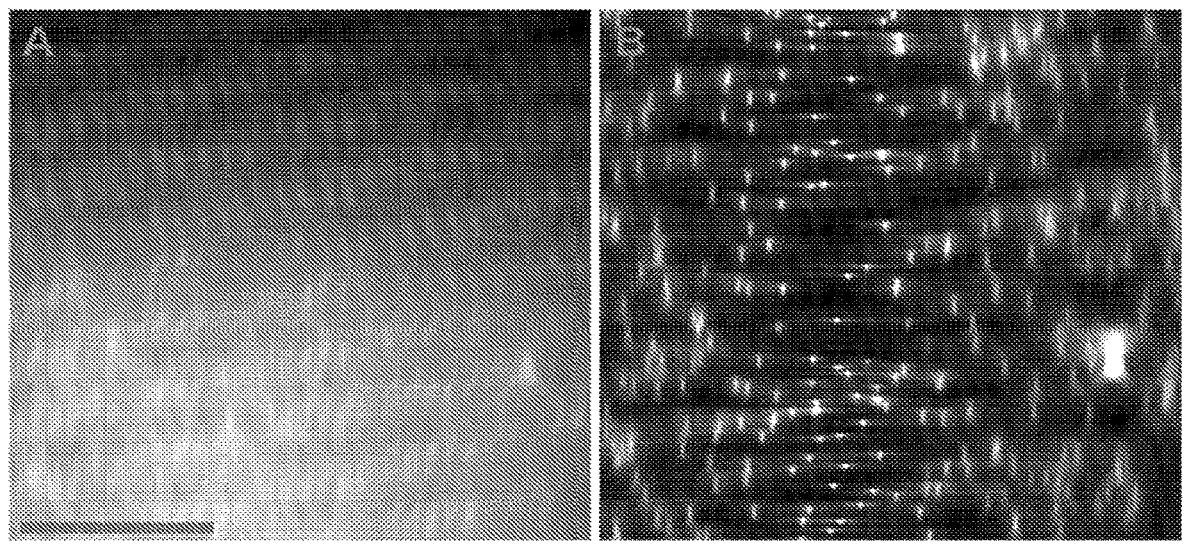
FIG. 13 depicts, in accordance with embodiments herein, Y projections of 1 µm fluorescent beads in an agarose matrix. (A) With epifluorescence illumination. (B) With sideSPIM illumination. Scale bar, 40 µm.

The width of the light sheet is determined by the numerical aperture of the excitation lens independent of the detection lens. The minimum thickness (maximum axial resolution) is found at the beam waist, which can be determined by measuring the central width at 0 V scan amplitude, as depicted in panels (C) for the Olympus 60×NA 1.0 detection lens and (D) Olympus 10×NA 0.3 detection lens. The resulting beam waist of 1.7 µm is identical since the same excitation lens was used (Nikon 10×NA 0.3). To evaluate imaging performance of the sideSPIM setup in a hydrogel, a sample was prepared with green fluorescent spheres of 1 µm diameter (yellow-green Fluorospheres, Invitrogen) dispersed in a 1% agarose hydrogel. Three dimensional stacks were acquired by imaging 512 planes at a distance of 270 nm with the Olympus 60×NA 1.0 detection lens. The Y projection is shown in FIG. 13 for epi-illumination (A) as well as with light sheet illumination (B). As expected for epi-illumination there is no optical sectioning. Instead, with light sheet excitation the individual beads are clearly visible. Since the light sheet was formed with a Gaussian beam, the axial resolution diminishes towards the periphery of the light sheet.

Example 7

Prototype, with Index Matching

Figure 14:
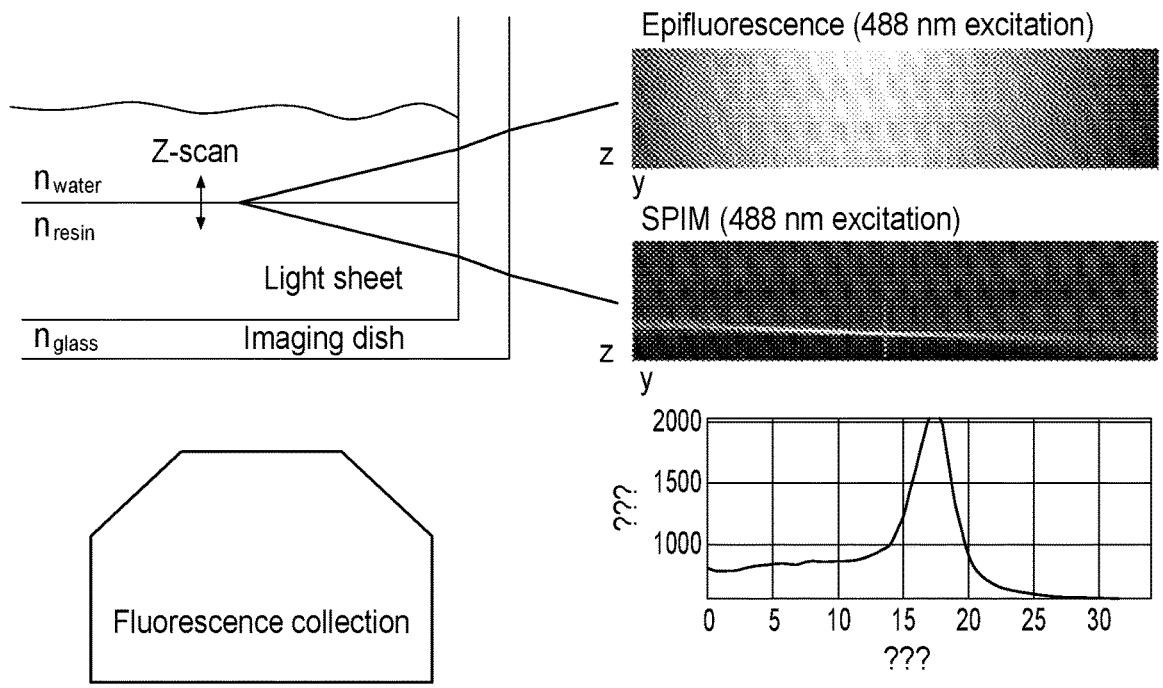
FIG. 14 depicts, in accordance with embodiments herein, demonstration of matching of the refractive index. Since the resin has a refractive index with a difference of less than 0.1% compared to the immersion medium (here: water), aberration-free imaging of the surface is possible via side illumination with a light sheet.

A working prototype was built and several measurements were tested on it to assess the capabilities of the new design disclosed herein. To verify that optical aberrations are minimal after introduction of the resin to match the refractive index, the inventors coated a piece of 1 mm thick resin with the fluorescent dye Rhodamine 110 and subjected it to SPIM imaging with side illumination. The inventors acquired z-stacks with epi-illumination as well as light sheet illumination. The results are shown in FIG. 14. With epi-illumination no z-sectioning is obtained. With SPIM, however, the Rhodamine 110 layer is clearly visible. A full width at half maximum of 1.6 µm can be achieved with an excitation lens NA of 0.3. The slight background fluorescence on top of the resin comes from residual Rhodamine 110 in the water solution.

Figure 15:
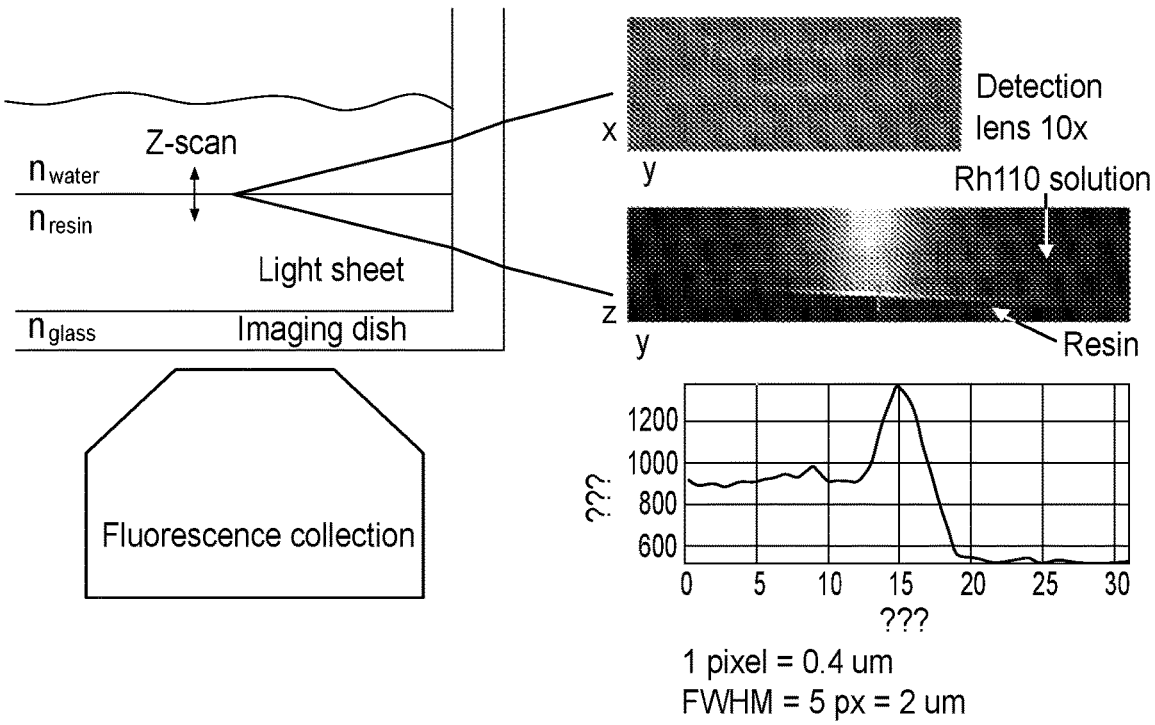
FIG. 15 depicts, in accordance with embodiments herein, two-photon excitation of Rhodamine 110 on top of the resin.

As illustrated in FIG. 15, the design is compatible with 2-photon excitation (FIG. 15). The top right image compares the excitation volume of the single vs the two photon excitation beam. This image was acquired with the 10× instead of the 60× detection lens to illustrate the difference in shape. With single photon excitation every fluorophore in the way of the beam gets excited, whereas with two photon excitation, excitation happens only in the very center where the intensity is high enough. The center right image shows the same layer of Rhodamine 110 as in FIG. 14 but excited with 780 nm light (60× detection lens). A FWHM of 2 µm is achieved. Again, the slight background fluorescence on top of the resin comes from residual Rhodamine 110 present in the water solution.

Figure 16:
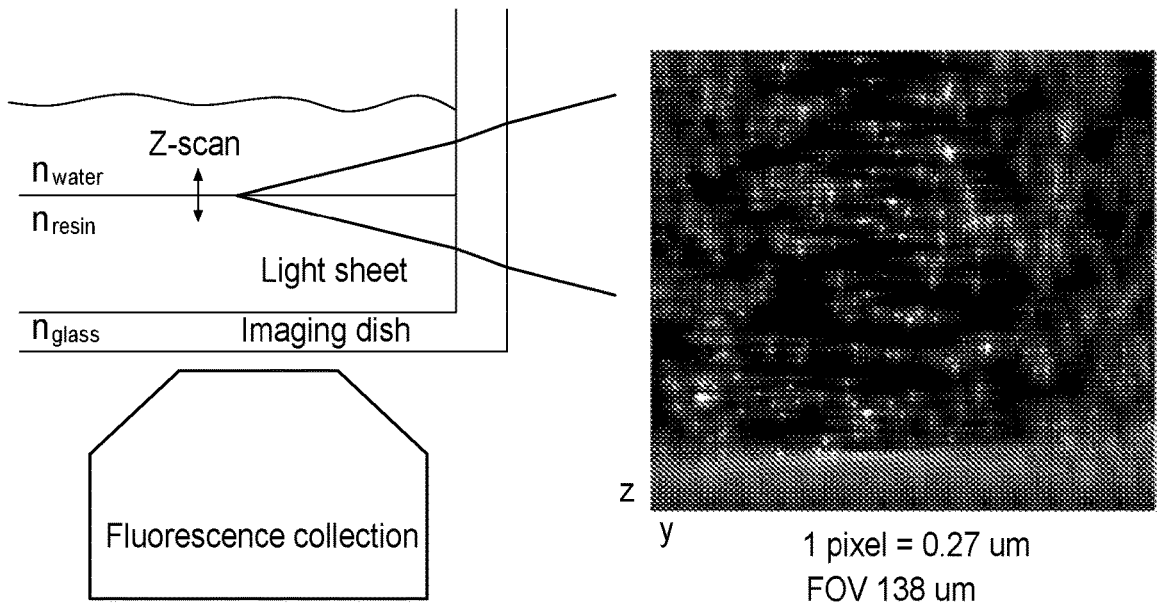
FIG. 16 depicts, in accordance with embodiments herein, Y-projection of SPIM image stack of 1 um green fluorescent beads embedded in an agarose gel layered on top of the resin mounted inside the two window sample chamber imaged by SPIM with side illumination. Field of view, 138 µm.

1% agarose hydrogel containing green fluorescent spheres of 1 µm diameter was layered on top of the resin mounted inside the two window sample chamber and subjected it to SPIM imaging with side illumination (single photon excitation with blue light, same imaging parameters as without the resin). A stack of 512 images at a distance of 270 nm was acquired. The beads are clearly visible all the way down to the surface of the resin as depicted in the y-projection of the corresponding z-stack shown in FIG. 16.

Figure 17:
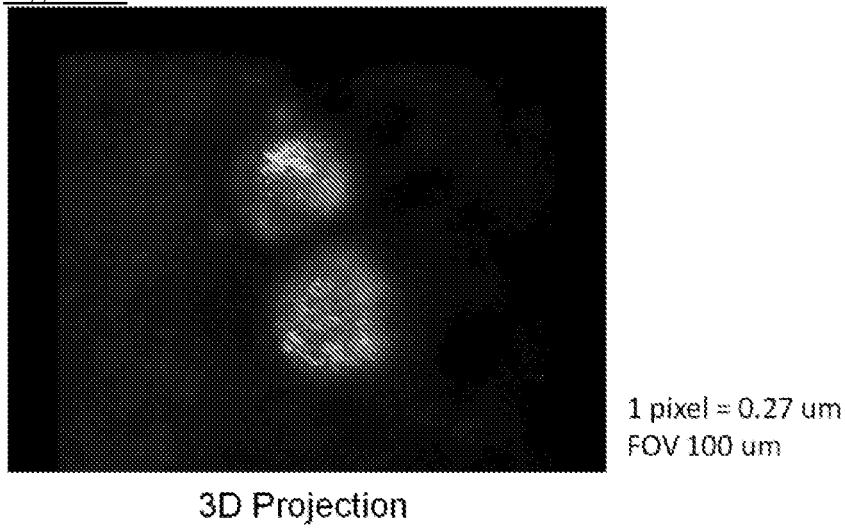
FIG. 17 depicts, in accordance with embodiments herein, 3D Projection of a stack of images acquired with SPIM with side illumination. The cells were labeled with cell mask deep red.

Finally, the design was tested on cells grown on top of the resin that were fluorescently labeled with the membrane dye cell mask deep red. In this case, fluorescence was excited in a band of 628-638 nm and detected with a 650 nm long pass filter. A stack of 256 images at a distance of 400 nm was acquired, the resulting projection of the image stack is shown in FIG. 17.

Example 8

Applications of the SideSPIM System

Figure 18:
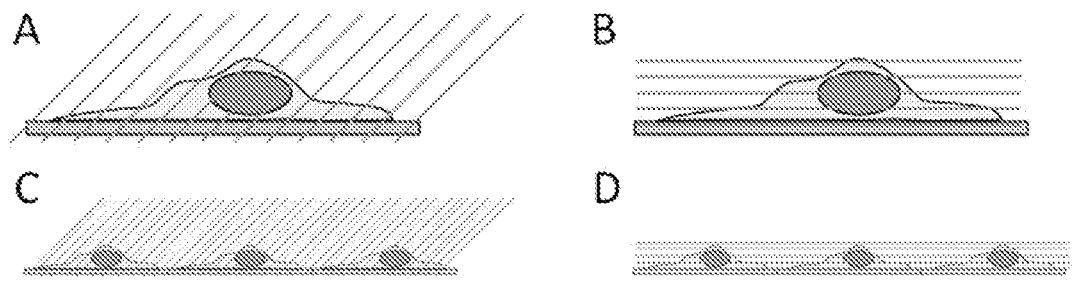
FIG. 18 depicts, in accordance with embodiments herein, optical sectioning in an upright/inclined SPIM (A, C) geometry versus a horizontal, side-illuminated geometry (B, D). (A) When imaging at a 45° angle as in upright/inclined SPIM many equidistant planes (cyan lines) need to be acquired to image an entire cell. (B) With horizontal, side-illuminated SPIM much fewer planes are required to image the same cell, since the sample is sectioned along the direction of the least extension. This is especially true when imaging many cells grown on the same surface (C, D).

Optical sectioning through plane illumination, the high frame rates possible with camera-based detection in combination with a fast piezo stage renders the instant system ideal for fast, three-dimensional time lapse imaging. In principle, every (plane illumination) microscope can be fitted with a fast stage for volumetric imaging. In the case of an upright/inclined SPIM system, the imaging plane is oriented at a 45° angle with respect to the sample and stage. Hence, optical sectioning occurs at a 45° angle as well (FIG. 18 A). However, in the case of samples with a low extension in the axial direction as compared to their lateral size, such as a monolayer of cells, it is favorable to optically section the sample along the vertical direction (B). By sectioning along the vertical direction the number of planes to capture the same specimen is minimized, which in turn allows for faster imaging of a larger field of view. This is especially important when imaging multiple cells growing on the same surface as illustrated in FIG. 18 C,D. With sectioning at a 45° angle the number of planes required increases with the number of cells to be imaged. In the sideSPIM configuration, the number of planes required does not change as long as the cells are within the field of view of the camera.

Consequently, objects with an axial extension of a few tens of micrometers such as cells or giant vesicles can be three-dimensional imaged on the subsecond timescale.

Example 9

3-Dimensional Imaging of GUVs of Different Lipid Concentrations

Figure 19:
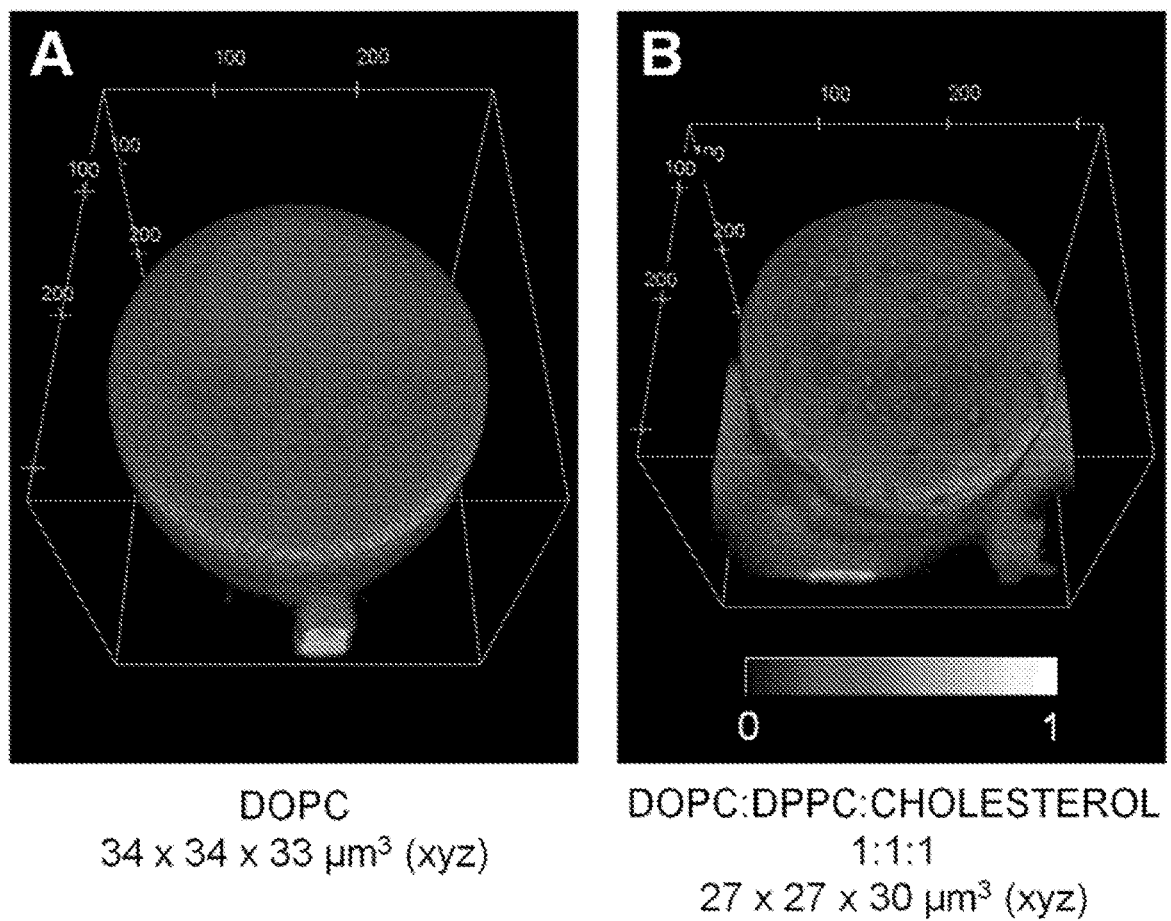
FIG. 19 depicts, in accordance with embodiments herein, fluorescently labeled GUV's with different lipid compositions have been grown and subjected to SPIM imaging. The projections of the 3D reconstructions are shown. Depending on the lipid composition, different fluorescence intensity patterns can be observed.

Giant unilamellar vesicles (GUVs) with different lipid compositions were prepared. To attach the GUVs to the resin surface, a coating protocol with biotin-bovine serum albumin (b-BSA) was used. Briefly, the resin was coated with a solution 1% BSA and 0.1% b-BSA. The GUVs was doped with 0.1% molar of biotin-phosphatidylethanolamine (b-PE) and 0.5% molar DiIC18 (Invitrogen, GE). An electro-formation protocol was used to grow the GUVs, lipids was deposited on a platinum wire and later dry in vacuum for an hour. Then, the Pt wires were connected to a function generator with 2 V p-p and 10 Hz sinusoidal function, for 1 hour above the melting transition. After 1.5 hour the sample was disconnected and allowed to decrease the temperature to room temperature. GUVs was carefully transferred to the coated chamber and immediately imaged. Fluorescence of DiIC18 was excited in a band of 465-495 nm and detected using the Olympus 60×NA 1.0 objective through a 535/50 nm band pass filter. Z-stacks of the three different samples were acquired at an axial spacing of 500 nm while the camera pixel size at the sample was 107 nm. The differences in lipid composition are immediately apparent from the 3D reconstructions (FIG. 19). While DOPC alone forms a homogeneous membrane (A), the ternary mixture of DOPC, DPPC and Cholesterol allows liquid phase coexistence. Since the dye DiIC18 has different affinities for the different phases, these can be identified as dark patches.

Example 10

Mapping the Diffusion of Lipid Domains on the Surface of a GUV

Figure 20:
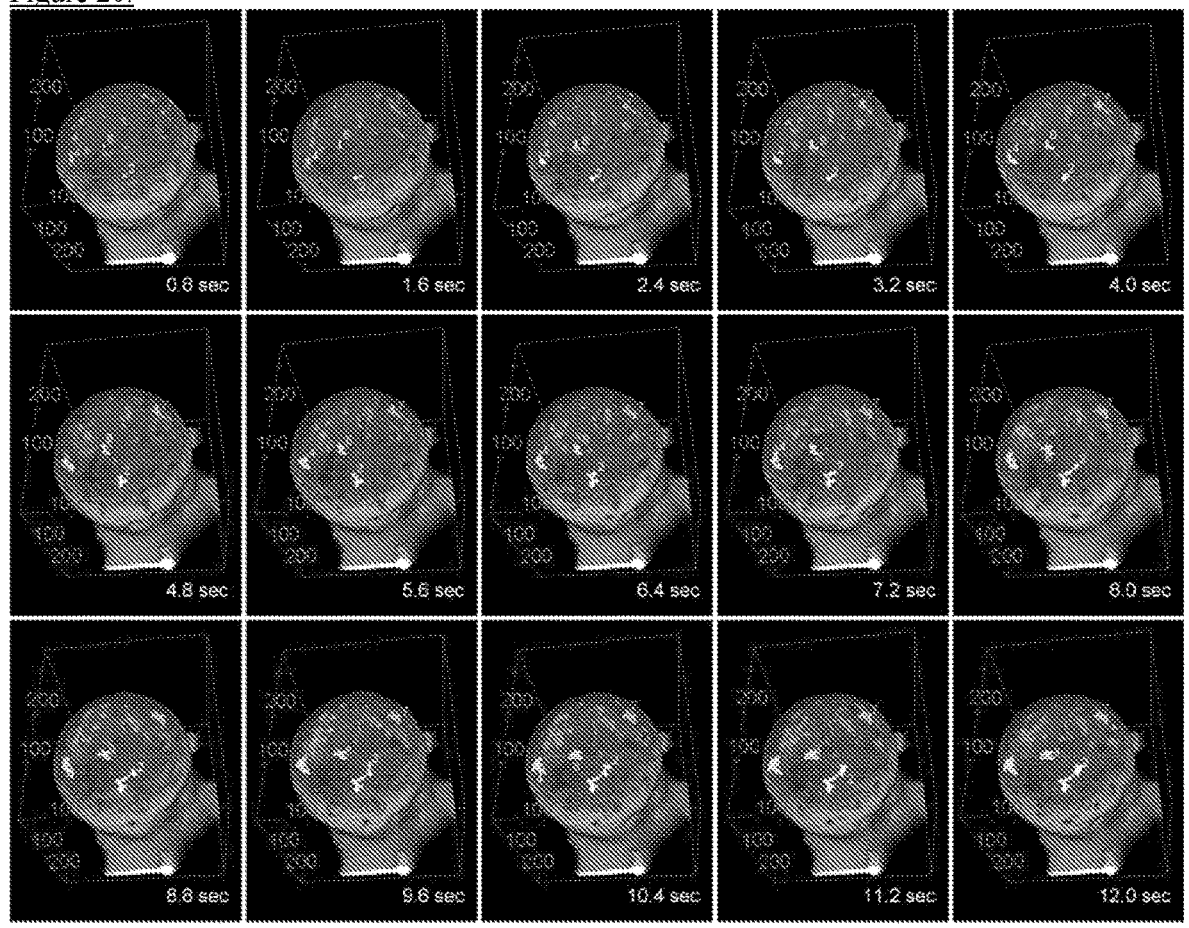
FIG. 20 depicts, in accordance with embodiments herein, three-dimensional renderings of lipid domains in a GUV imaged at 0.8 s intervals, the size of the red box is 38×38×30 µm3. The time resolution is sufficient to observe the diffusion of individual lipid domains in 3D on the surface of the GUV, six exemplary tracks are shown. Note that there is no visible photobleaching.

With the microscope system disclosed herein, the inventors were able to follow the diffusion of lipid domains in a ternary mixture that allows liquid phase coexistence (DOPC:DPPC:Cholesterol, 1:1:1) on the entire GUV as shown in the 3D renderings at different time points in FIG. 20 (the full movie is provided as an attachment). 3D stacks of 60 planes were imaged with a step size of 500 µm at 800 ms intervals. The exposure time for a single plane was 10 ms resulting in 600 ms for all 60 planes plus a 200 ms overhead for repositioning of the piezo stage at the starting position. The domains freely diffuse on the surface of the GUV, six exemplary tracks are shown. Note that the images shown here represent only a subset of the full acquisition of 60 s length. During this time, the photobleaching was negligible. All samples were imaged at room temperature (23° C.). For image acquisition the open source microscopy software Micro Manager (https://micro-manager.org/) was used. 3D images were rendered with Fiji ImageJ (https://fiji.sc/).

Example 11

High Throughput Three-Dimensional Time Course Imaging

Figure 21:
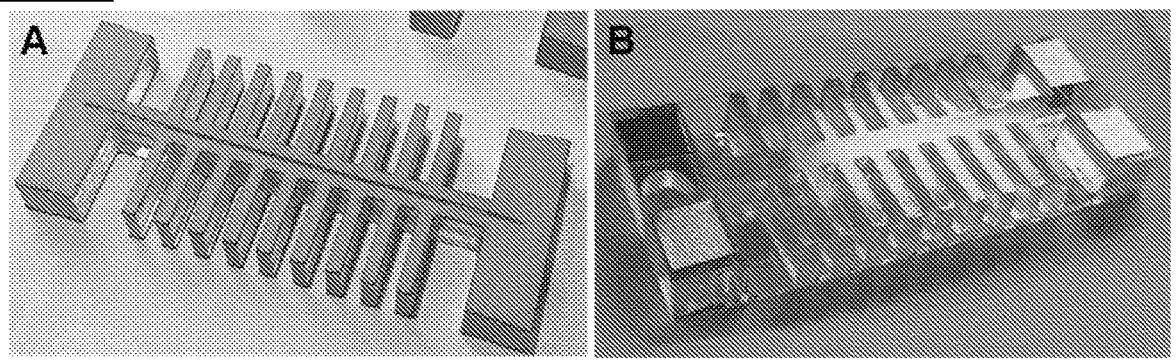
FIG. 21 depicts, in accordance with embodiments herein, embodiments of the multiwell chamber for high throughput imaging using side illumination SPIM. (A) Chamber 'skeleton' laser cut from a sheet of 6 mm thick plastic. (B) Finished chamber with cover slides attached to the sides and the bottom. Four pads of 0.1 mm thick steel are glued to the corners allowing the chamber to easily attach to the microscope stage via magnets.

In one embodiment, the sample chamber was redesigned with respect to miniaturizing the individual sample compartments. The size of each well is now 2×10×6 mm3 holding about 50-100 µl of fluid. Photographs of the chamber are shown in FIG. 21.

Figure 22:
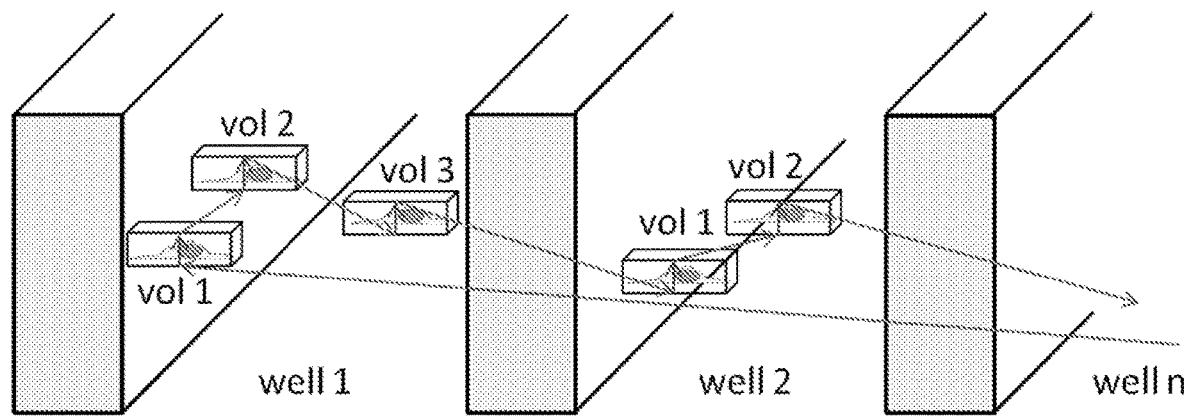
FIG. 22 depicts, in accordance with embodiments herein, high throughput acquisition scheme for a linear microwell chamber.

The sample chamber can be moved in the horizontal plane with the xy stage of the microscope, the axial direction can be scanned using the added piezo z stage. High throughput three-dimensional time lapse imaging can be performed with the following scheme. The xy stage is used to move to a volume of interest inside the first well, e.g., containing a cell. In less than a second all sections of this volume are acquired using the piezo stage. If needed, the xy stage is then used to move to other volumes of interest in the same well for subsequent 3D imaging. When all volumes of interest are imaged, the xy stage is used to move to the second well. The procedure is repeated for each well. The entire sequence is restarted after the last well. This way, multiple samples can be followed in 3D with a time resolution on the order of tens of seconds, depending on the total number of volumes of interest. This acquisition scheme is illustrated in FIG. 22.

So far, one of the most relevant applications of this arrangement could be the high throughput drug screening in the pharmaceutical industry.

Example 12

Imaging Bacteria Forming a Biofilm

In one embodiment, the sideSPIM imaging is combined with a microfluidic culture system. This experimental platform is used to image a biofilm growing mimicking host colonization with the goal to observe differences between the exterior and interior bacteria cells. With conventional microscopy methods, imaging of such biofilms has remained challenging. The lack of temporal resolution of laser scanning confocal microscopy and the lack of optical sectioning in widefield epi-fluorescence microscopy, combined with the phototoxicity of both methods can be avoided by using sideSPIM. From the 3D time lapse acquisitions, the growth and formation of the biofilm was quantified and its role in protecting and promoting bacteria during host colonization was studied.

Example 13

Multichannel Detection

For many samples it is desirable to be able to detect fluorescence in multiple channels, separated for example by color, such that two fluorophores of different emission spectra can be imaged simultaneously. For the instant system, the fluorescence was split into four channels, separated by two colors and the two orthogonal polarizations. As an example of multiple-channel detection, the four channels detection is applied to study the dynamic of cellular membranes using LAURDAN fluorescence. This dye was largely used to study de polarity of the membrane in vitro and in cellular experiments. Based on a spectral shift driven by the change in the membrane polarity it is possible to study the organization of the membrane. Besides, the changes in polarity are correlated to changes in membrane viscosity, usually, evaluate by anisotropy measurements. Anisotropy measurements are difficult in regular confocal microscopy, however, are simpler in the SPIM configuration by the optic arrangement. The idea is to collect to color channels (by a band pass filter) and measure the anisotropy at the same time, by the addition polarizers to get parallel and perpendicular to emission respect to the excitation. This approach would allow to simultaneously measure the spectral shift and anisotropy, pixel by pixel, with ultrafast parallel acquisition using the camera detection. The acquisition of the polarity and viscosity simultaneously with unprecedented temporal and spatial resolution should allow better compression in the complex dynamic of the cellular membranes.

Example 14

Fluorescence Lifetime Imaging

Recently, CMOS camera technology has been adopted to measure luminescence decays such as fluorescence lifetimes (pco.flim, PCO). The only requirement is synchronization of the camera to a modulated or pulsed light source. Both the lasers used in the sideSPIM prototype are pulsed, the white laser at 20 MHz and the Ti:Sa laser at 80 MHz.

In one embodiment, a FLIM camera is installed on the right side port of the Olympus IX71 body used in the sideSPIM system. This allows to perform 3D FLIM imaging with unprecedented speed and minimal photobleaching. In combination with two photon excitation, this can be used for video-rate label-free imaging of, for example, NADH in live cells and tissues.

Example 15

Discussion

The instant disclosure combines the benefits of the SPIM designs while avoiding the drawbacks of the individual methods. Thick samples such as cells, tissues or small organisms embedded in a hydrogel as well as flat samples such as a monolayer of cells can be imaged using the instant system. No dipping into the sample container is required, it can be sealed if desired or the space can be utilized for sample support, treatment or additional monitoring. High numerical aperture lenses can be used with this design resulting in single molecule sensitivity. This allows for the application of methods involving single particle localization and tracking as well as fluorescence fluctuation techniques. The sample volume can be large or small as desired. The observation plane is parallel to the sample surface maximizing field of view for flat samples. And, since the side illumination unit as well as the sample chamber are both additions independent of the main microscope platform, SPIM capability can be added to any existing inverted microscope. Further, since the size of the individual wells can be very small as opposed to designs that require optics dipping into the sample chamber, a large number of wells can be accommodated within the same chamber to allow for automated, high throughput three-dimensional time course imaging with sideSPIM. To verify that optical aberrations are minimal after introduction of the resin to match the refractive index, a piece of resin was coated with the fluorescent dye Rhodamine 110 and subjected it to SPIM imaging with side illumination. Z-stacks were acquired with epi-illumination as well as light sheet illumination. With epi-illumination no z-sectioning is obtained. With SPIM, the Rhodamine 110 layer is clearly visible. A full width at half maximum of 1.6 µm was achieved with an excitation lens NA of 0.3.

In one embodiment, the inventors have constructed a sample chamber with a large number of microwells arranged in a line to allow for three-dimensional time lapse imaging of multiple specimen (high throughput) with all the benefits SPIM provides such as high speed and minimal photobleaching. In one embodiment, the instrument can be used on a regular basis for advanced research projects. In one embodiment, a quadruple view for the camera is implemented, such that two color and polarization channels can be imaged simultaneously. In one embodiment, the device further includes fluorescence lifetime measurement capability. In one embodiment, the two-photon excitation is optimized by exciting with non-Gaussian beams. In one embodiment, the system disclosed herein further provides an incubator to control the temperature and gas concentration (such as amount of $CO_2$ gas) at the sample.

Example 16

Updated-Overview

To reduce cost and complexity while maximizing flexibility, it is highly desirable to implement a new imaging technology such that it can be added to a standard research microscope. While doing so, all of the previous functionality should be maintained and modifications to the existing system should be kept to a minimum. At the same time, the implementation should be able to take full advantage of the employed technology. Additionally, sample handling should be compatible with established methods and operation of the system should not require labor intensive adjustments. Previously described selective plane illumination microscopy techniques typically compromise at least one of those parameters, e.g., spatial resolution is sacrificed to simplify sample handling or vice versa. The inventors devised a new technology termed sideSPIM that meets all requirements simultaneously while also offering new applications of SPIM towards microfluidics and high throughput 3D imaging of multiple samples.

Selective plane illumination microscopy (SPIM) is one of the most suitable techniques for fast, three-dimensional imaging. By confining the excitation light to a sheet, SPIM combines axial sectioning capability with minimal light exposure and fast, camera-based image acquisition. SPIM typically uses two (objective) lenses arranged perpendicular to each other. One lens is used for light detection, while the focal plane of that lens is illuminated with a sheet of light generated via the other lens. To generate the light sheet, cylindrical optics can be used. Alternatively, the beam can be rapidly scanned across the field of view of the detection lens to generate the sheet illumination. However, the arrangement of two objective lenses perpendicular to each other provides a number of challenges in terms of instrument design and sample geometry as explained in the following. Initially, SPIM was designed around the specimen with excitation and detection in the horizontal plane. This requires specific sample preparation, typically embedding the sample in a hydrogel such as agarose. This excludes the use of conventional sample mounts, such as coverslips, culture dishes and multi well plates as illustrated in FIG. 1.

To overcome this limitation, a popular approach is to dip into the sample container from the top, with both lenses typically but not necessarily at a 45° angle with respect to the sample plane. Such a system can be mounted on top of an inverted microscope or implemented as an independent instrument. In this configuration, the objectives are immersed in the same fluid as the sample, which in most cases is either air or water. With water dipping lenses, a numerical aperture (NA) of up to 0.8 can be utilized. Lenses of higher NA can be used by raising the sample into the gap between the two lenses (see FIG. 2).

This large NA lens allows the application of fluorescence fluctuation methods. The drawbacks of this geometry include the requirement of a large sample container to accommodate both lenses resulting in a large immersion volume. This can cause sample disturbance due to flow/convection and increases the amount of reagents needed. Further, there is no isolation of optics and sample which is problematic when dealing with hazardous samples (toxic, cancerous, infectious, etc.). Also, dipping into the sample container from the top limits access from that direction. This makes it difficult to fit devices for sample support and monitoring such as incubators, microfluidic devices, electrodes, brightfield illumination, etc. Finally, since the observation plane is at an angle with respect to the sample container, the field of view for flat samples, such as a monolayer of cells, is limited, i.e., the full field of view of the detector cannot be utilized. Another approach to using high NA lenses is reflected light sheet microscopy, in which the light sheet is generated by reflecting a beam incident from the top by 45° with a small mirror mounted on an atomic force microscope cantilever[4]. With this approach, the light sheet is parallel to the sample plane, hence, for flat samples such as a cell monolayer, the full field of view of the detector can be utilized. However, this method requires precise positioning of the mirror very close to the sample. Also, the mirror as well as the excitation lens are introduced from the top and dipped into the sample container, again limiting access and prohibiting sample isolation. Also, chemicals present in the immersion fluid can degrade the mirror so it has to be replaced regularly. Finally, objects very close (<2 µm) to the bottom of the sample container, such as the bottom membrane of a cell, cannot be imaged in this configuration. Alternatively, high NA detection can be realized via a prism-coupled light-sheet condenser design that redirects the light sheet horizontally onto a sample at the focal plane of an imaging objective. The lack of a cantilever facilitates sample handling and operation of the system. However, the sample container is tilted at a horizontal angle of approximately 20°, so care has to be taken when filling the sample dish with the immersion fluid. Again this design demands open access from the top with the same drawbacks as mentioned before. A design that allows access from the top uses a water prism that compensates for aberrations introduced when illumination and imaging from the bottom at an angle through a coverglass. However, this solution cannot be mounted on a regular inverted microscope due to size constraints. Also, this configuration does contain additional sources of aberration, primarily due to imaging through a tilted coverslip. Hence, it is more suitable for low resolution imaging. Another design integrates a sample cuvette with side illumination into a stage inset of an inverted microscope. While this approach is compact and low cost, it provides relatively low axial resolution (>5 µm) and demands specific FEP tube-mounted samples. Finally, SPIM implementations using a single lens do not suffer from opto-mechanical constraints of two lens designs but are limited in spatial resolution and/or imaging depth.

This invention describes selective plane illumination in the conventional sample geometry. Our design is based on a regular inverted microscope where the sample is illuminated from the side via an accessory. A custom designed chamber with multiple wells featuring two optically transparent windows is used to allow side illumination and light detection from the bottom. This way, all microscope ports remain available for other purposes. Also, there is unrestricted access from the top which can be used, for example, to fit the connections of a microfluidic device. Without the need of dipping into the sample container, smaller sample volumes (<1 ml) can be realized and the use of high NA lenses is facilitated. Still, all kinds of samples can be used including both, flat samples such as monolayers of cells or bacteria on a surface and specimen such as cells, tissues and organisms embedded in hydrogels. Distortion-free imaging of flat samples is achieved via matching of the refractive index. Also, isolation of optics and sample allows imaging of sealed sample containers when demanded, e.g., for samples treated with potent toxins. Further, in this design, the orientation of the imaging plane is parallel to the surface of the sample container which is desirable for flat samples where it maximizes the field of view. Finally, since the observation well volume can be very small, high throughput 3D imaging of multiple wells is possible.

Example 17

Updated-Detailed Description

In accordance with various embodiments herein, some components of the sideSPIM include:

1) Side illumination unit. All optical components required to generate the light sheet illuminating the sample are mounted onto a single platform. This unit can be coupled to any inverted microscope.

2) Two window sample chamber. With two optically transparent windows perpendicular to each other, the light to generate the sheet illumination at the sample plane can be introduced from the side. Magnetic attachment of the chamber to the microscope stage ensures easy to handle, stable and reproducible mounting.

3) Refractive index matching. By raising the sample inside the chamber well using an optically transparent material with a refractive index identical to the sample immersion fluid, samples can be imaged distortion free all the way to the bottom. Index matching also allows imaging of flat samples such as a monolayer of cells in the first place.

These components are described in the following.

Side Illumination Unit:

A sideSPIM prototype (located at the Laboratory for Fluorescence Dynamics, Natural Sciences 2, Room 3311, University of California Irvine) is shown in FIG. 3.

The system is based on an inverted microscope (IX71 fitted with epifluorescence illumination unit, Olympus) with camera detection (Edge 4.2, PCO). A motorized xy stage (MS-2000, ASI) holds a piezo xyz-stage (NANO-PDQ375, Mad City Labs) fitted with a custom magnetic sample holder inset. The stage assembly is raised by 36 mm using spacers to make room for the objective lens of the side illumination unit located on the left. Besides being installed onto the same flat and rigid mounting surface (Smart Table UT2, Newport), no further mechanical connections from to side illumination unit to the microscope body are required. A more detailed view of the side illumination assembly is shown in FIG. 4.

With this unit, the light sheet is generated and injected into the sample. The assembly consists of a white laser source, WL (SC 390, Fianium), for excitation with visible light. From the fiber output the light is reflected of a dichroic mirror, DM1 (LP670), and passed through a short pass filter, F1 (SP680), to remove the near IR portion of the laser output which is directed onto an absorber, A (LB1, Thorlabs). The visible portion is passed through a shutter, S (LS3, Uniblitz), followed by a motorized filter wheel, F2-7 (FW102C, Thorlabs), containing six different filters (440/40 nm, 480/30 nm, 535/30 nm, 572/15 nm, 633/10 nm and ND3) which define the excitation wavelength band. To ensure a Gaussian beam profile the filter wheel is followed by a spatial filter. In the spatial filter, the laser beam is focused onto a 10 µm pinhole, PH (P10S, Thorlabs), via a lens of 30 mm focal length, L1 (AC254-030-A, Thorlabs), and collimated by a lens of 50 mm focal length, L2 (AC254-050-A, Thorlabs). Redirected with a mirror, M1, the beam is then passed through an adjustable iris, I (SM1D12, Thorlabs), to control the beam diameter. Reflected off a second mirror, M2, and a long pass dichroic mirror, DM2 (LP670), the beam is redirected onto the scanning mirror assembly, XY (A402, ISS). In addition, a pulsed tunable Ti:Sa laser (Chameleon Ultra, Coherent) for two-photon excitation located behind the sideSPIM setup on the same optical table is free space coupled into the side illumination unit from the bottom. The laser intensity is modulated by an acousto optic modulator (AOM, AA Opto Electronic) placed immediately after the laser output. After directing the beam to the illumination unit via four mirrors on the optical table it is reflected off a mirror, M3, and collimated by a telescope consisting of two lenses of 50 mm focal length, L3 and L4 (AC254-050-B, Thorlabs). Via two more mirrors, M4 and M5, the Ti:Sa beam is passed through the same long pass dichroic mirror, DM2 (LP670), to be joined with the visible laser light. The combined beam is then relayed towards the excitation objective (10× CFI Plan Fluorite NA 0.3, Nikon) via a scan lens, SL (#49-356, Edmund Optics), and a tube lens, TL (180 mm, Olympus). Rapid scanning of the horizontal axis results in the generation of a light sheet in the plane of the detection lens. Alternatively, instead of scanning the beam, cylindrical optics could be used to generate the sheet. The scanning, however, facilitates two-photon excitation and has the advantage that non-Gaussian beam profiles could be generated. The light generated in the sample is collected by the detection lens and, after passing through the internal tube lens and fluorescence filters (DAPI, GFP and TexasRed filter sets and a 650 nm long pass filter) of the inverted microscope, imaged onto the CMOS camera (Edge 4.2, PCO) mounted to the left side port of the microscope. Hence fluorescence is collected the same way as with conventional epi-illumination through the backport. Brightfield illumination is possible via the lamp and condenser arrangement mounted on top. The right side port of the microscope is still available and could be fitted with another excitation/detection system. Any combinations of excitation and detection lens can be used, with the only restriction that the focal points of the two lenses have to overlap without mechanical collision of the two lenses. The objective lens arrangement and the sample holder is shown in FIG. 5. Panel (A) shows a top view of the microscope stage with the sample holder, on the left, the tube lens from the side illumination unit can be seen. A piezo xyz-stage (NANO-PDQ375, Mad City Labs) is mounted on top of a motorized xy stage (MS-2000, ASI). The inset of the piezo stage is fitted with the custom sample holder, as can be seen in panel (B). It consists of a vertically mounted linear stage (MS1S, Thorlabs) onto which the actual sample holder is mounted to. The linear stage allows for manual adjustment of the sample z position. Panels (C) and (D) show the objective lens configuration. The detection lens (LUMPLFLN60×/W NA 1.0, Olympus) is located in the turret that is part of the inverted microscope. Hence, detection lenses can be easily changed by rotation of the turret, if different magnifications are required for image acquisition. In the current prototype we use a 10×NA 0.3 water dipping lens for excitation (10× CFI Plan Fluorite NA 0.3, Nikon), and switch between a 10×NA 0.3 air objective (10× Plan Fluorite Objective NA 0.3, Olympus) and the 60×NA 1.0 water dipping lens in detection depending on the resolution/field of view demanded. A rubber O-ring is utilized to stop water from flowing down the 60×NA 1.0 water dipping lens. The excitation lens is mounted on an xz manual platform (MT1, Thorlabs) attached to the illumination unit to align the light sheet with the optical axis of the detection lens. The microscope turret z-drive is then utilized to align the focal plane of the detection lens with the light sheet. The stage assembly is raised by 36 mm using aluminium spacers to make room underneath the motorized xy stage for the objective lens of the side illumination unit.

Three-dimensional imaging is achieved by scanning the sample in axial direction with the piezo z-stage inset. The sample holder is machined from aluminium, its t-shaped legs hold four magnets, one in each corner, to ensure easy and secure sample attachment. A sketch of the sample holder is shown in FIG. 6 (A). The screws that attach the legs to the frame also act as pins that fit into corresponding holes (5 mm diameter) in the sample chamber. Panel (B) displays how the chamber attaches to the sample holder.

Two Window Sample Chamber:

In order to inject the light sheet into the sample from the side with the side illumination unit, the sample chamber needs to have two optically transparent windows, one on the bottom and one on the side of each well. A sketch of our sample chamber design including dimensions is shown in FIG. 7A. The first prototype was machined from aluminium. To save time and cost, the inventors then switched to laser cutting the backbone of the chamber from 6 mm thick plastic. Three pieces of glass are then attached to create the chamber wells, one on the bottom and two on the sides of the chamber backbone. For the bottom, the inventors used commercially available cover glass measuring 60 mm×24 mm of 0.17 mm thickness (22266882, Fisherbrand). The two side windows (52 mm×6 mm) are cut from the same cover glass slides using an engraving pen (Z225568-1EA, Sigma). Watertight attachment is achieved by means of an UV curable optical adhesive (NOA60, Thorlabs). Finally, four steel pins are glued into holes pre-drilled during the laser-cutting process on the corners to allow the chamber to attach to the four magnets embedded in the feet of the sample holder. A figure of the raw material is shown in panel (B, C), while panel (D) displays a picture of the fully assembled chamber.

The exact dimensions are not critical for the function of the system and can be adopted to optimally accommodate the sample under study. Especially, since the well size can be very small, a large number of wells can be arranged in a line to allow for high throughput imaging. Each well can be addressed in an automated way by movement of the sample chamber with the motorized stage. The only requirements of the design are two thin, optically transparent windows, one on the bottom and one on the side. For the prototype we used microscope cover glass of 0.17 mm thickness but other transparent materials would work as well. For samples embedded in a transparent medium there are no further requirements for imaging. FIG. 8A illustrates how the light sheet is generated in the sample. The inventors filled one well of the chamber with a 100 nM solution of the fluorescent dye Rhodamine 110. Panel (B) shows the light sheet generated by excitation with blue light (480 nm).

The only change in refractive index occurs at the transition between window and mounting medium. Since this transition occurs perpendicular to the optical axis there are no significant optical aberrations. The inventors demonstrated this with a solution of the fluorescent dye Rhodamine 110, an image of the light sheet can be seen in FIG. 7, right panel. It has to be noted, however, that as soon as a significant amount of light passes through a material of different refractive index, e.g., when trying to image an object close to the bottom of the sample chamber, optical aberrations occur. This can be avoided by matching of the refractive index.

Refractive Index Matching:

While in solution or in a hydrogel (e.g. agarose, collagen, gelatin, etc.) the mismatch in refractive index between the bottom window of the chamber and the sample mounting medium can be avoided by imaging in the center of the mounting medium (see FIG. 8A), imaging a monolayer of cells or bacteria on a surface represents exactly such problem (FIG. 9A). However, a mismatch can be avoided if the flat sample is mounted on top of an optically transparent material with a refractive index that is the same as the surrounding medium (FIG. 9B).

To quantify the allowed mismatch for distortion free imaging, we calculated the point spread function at the support/solution interface using wavefront optics. The distortion is a function of the NA of the lens used for illumination and the distance between side window and the optical axis of the detection lens.

In the excitation path (FIG. 24A herein) a lens with focal length, f and aperture, $d_0=2r_0$, is focusing the illumination beam in a transparent medium of refractive index $n_M(x)=n_1$ above and refractive index $n_M(x)=n_2$ below the optical axis. With laser illumination, the incident light wave, $U_0(x, y)$, can be described as a monochromatic plane wave of unity amplitude propagating along the z axis. The lens and the medium in the light path introduce a phase retardation, $\phi(x, y)$, depending on the local thickness of the lens, $\Delta(x, y)$, $$\phi(x,y) = kn_L \Delta(x,y) + kn_M(x)[\Delta_0 - \Delta(x,y)], \quad (1)$$

with refractive index of the lens, $n_L$, maximum thickness of the lens, $\Delta_0$, and wave vector k. Hence the field leaving the lens, $U_L(x, y)$, can be described as $$U_L(x,y) = t_0(x,y) e^{-ik\Delta_0 n_M(x)} e^{-ik[n_L - n_M(x)]\Delta(x,y)}, \quad (2)$$

where the transmission by the lens aperture is given by $t_0(x, y)=1$ for $x^2+y^2 \le r_0^2$ and $t_0(x, y)=0$ for all other values. In paraxial approximation, the local thickness of the lens can be described by $$\Delta(x, y) = \Delta_0 - \frac{x^2 + y^2}{2}\left(\frac{1}{R_1} - \frac{1}{R_2}\right), \quad (3)$$

With $R_1$ and $R_2$ the curvature of the lens faces which can be substituted by the focal length $$\frac{1}{f(x)} = [n_L - n_M(x)]\left(\frac{1}{R_1} - \frac{1}{R_2}\right). \quad (4)$$

Substitution of Eqs. (3,4) in Eq. (2) yields the field immediately behind the lens $$U_L(x, y) = t_0(x, y)\exp(-ik\Delta_0 n_L)\exp\left(ik\frac{x^2 + y^2}{2f(x)}\right). \quad (5)$$

This field further propagates along the optical axis, hence, Fresnel diffraction can be used to calculate the field, $U_z(x_z, y_z)$, at a distance z=f, $$U_z(x_z, y_z) = -\frac{\exp(-ikz)}{i\lambda z}\exp\left(-ik\frac{x_z^2 + y_z^2}{2z}\right) \cdot \quad (6)$$

$$\int_{-\infty}^{\infty} dx \int_{-\infty}^{\infty} dy U_L(x, y)\exp\left(-ik\frac{x^2 + y^2}{2z}\right)\exp\left(-ik\frac{xx_z + yy_z}{z}\right),$$

where $\lambda$ is the wavelength of the excitation light with $|k|=2\pi/\lambda$. After substituting $U_L(x, y)$ in Eq. (6) the field at the focal plane z=f of the lens becomes $$U_z(x_z, y_z) = \quad (7)$$

$$-\frac{\exp(ikz)}{i\lambda z}\exp\left(-ik\frac{x_z^2 + y_z^2}{2z}\right)\exp(-ik\Delta_0 n_L) \cdot \int_{-\infty}^{\infty} dx \int_{-\infty}^{\infty} dy t_0(x, y)$$

$$\exp\left(ik\frac{x^2 + y^2}{2f(x)}\right)\exp\left(-ik\frac{x^2 + y^2}{2z}\right)\exp\left(-ik\frac{xx_z + yy_z}{z}\right).$$

Figure 24:
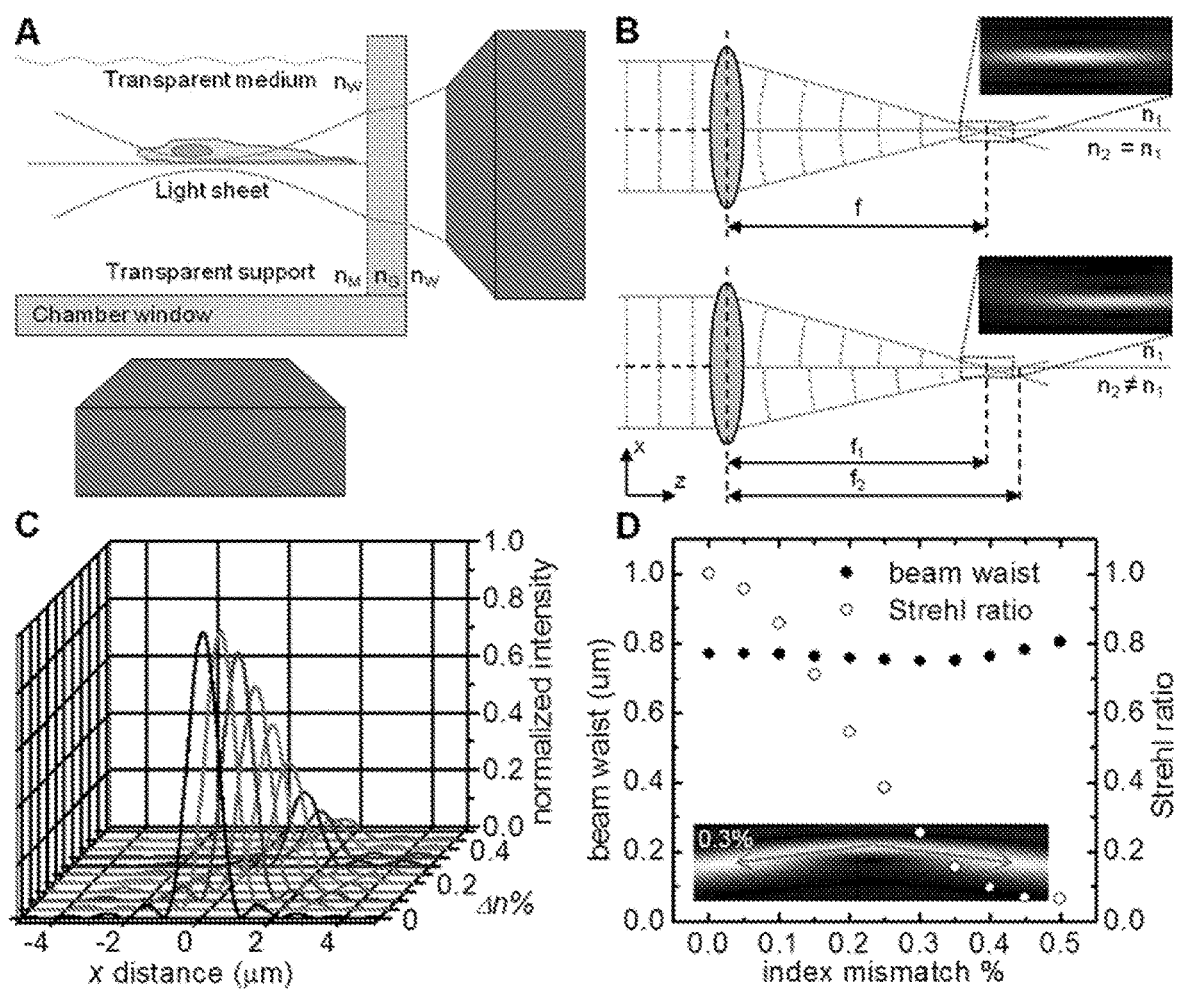
FIG. 24 depicts, in accordance with embodiments herein, various demonstrations of light illumination as further described herein.

To evaluate the maximum allowed deviation of the index of the immersion medium, $n_M(x)=n_1$, and mounting medium, $n_M(x)=n_2$, the diffraction pattern was calculated by numerical evaluation of Eq. (7) with an excitation wavelength of 500 nm, an excitation lens NA of 0.3, and an imaging depth of 1 mm from the side (computation was done in Matlab R2016b, MathWorks, Natick, Mass., USA). As a result of increasing index mismatch we observed a translation of the excitation beam focus along the optical axis, a shift normal to the interface of immersion medium and mounting medium, a broadening in width and a decrease in amplitude (see FIG. 24B, insets). In the microscope, position of the beam focus can be easily compensated by adjusting the position of the excitation beam. Therefore, as a criterion for the tolerable index mismatch, the inventors evaluated the increase in beam waist and decrease in amplitude. In FIG. 24C the cross section of the intensity profile along the x axis at the focus is plotted as a function of the refractive index mismatch, $\Delta n=1-n_1/n_2$, in percent. The inventors quantified the increase in beam waist ($e^{-2}$) (FIG. 24D) by fitting a Gaussian distribution to the intensity profiles plotted. The decrease in intensity was quantified by calculating the Strehl ratio, i.e., the ratio of the peak intensity of the distorted beam (here, $\Delta n>0$) to the maximum intensity of the ideal beam (here, $\Delta n=0$). While the Strehl ratio decreases rapidly, the minimum beam width remains almost constant until a mismatch of around 0.4%. The reason is that there is a shift of the intensity at the beam focus towards the periphery of the beam (see FIG. 10D, inset). This shift is not a problem, however, with a further increase of the index mismatch the beam shows a curvature and will no longer coincide with the focal plane of the detection lens. Therefore, with an excitation NA of 0.3, as used in the inventors' system, this calculation suggests that the mismatch in refractive index should ideally be <0.2%. Such material is commercially available, e.g., in the form of an UV curable resin (MY-133, EOC-Inc).

The inventors cure the resin between two glass slides to achieve a flat surface with the desired thickness. After curing, the resin is cut to size and transferred into the sample chamber, as illustrated in FIG. 11A-D.

Samples such as single cells can be grown on the resin followed by SPIM imaging with side illumination. Other samples that do not require culture such as giant unilamellar vesicles (GUVs) can simply be transferred into the sample chamber containing the resin for immediate imaging. Alternatively, hydrogels with a refractive index very close to water can be used as substrate as well. FIG. 11E shows 1 mm thick layers of collagen inside three chamber wells, the pink color comes from the pH indicator Phenol red that was mixed with the collagen to facilitate pH adjustment.

Demonstration of a Working Prototype:

The inventors have built a working prototype and performed several measurements to test the capabilities of the design.

Without Index Matching:

To test the system, they first imaged a 100 nM solution of Rhodamine 110. Fluorescence was excited in a band of 465-495 nm (100 µW before the excitation objective) and detected through a 535/50 nm band pass filter. The extension of the light sheet in the plane of excitation is defined by the scanning signal amplitude. FIG. 12 shows the fluorescence signal from the Rhodamine 110 solution using scanning amplitudes of 0.1 V (A) and 0.2 V (B), both acquired with the Olympus 60×NA 1.0 detection lens.

The width of the light sheet is determined by the numerical aperture of the excitation lens independent of the detection lens. The minimum thickness (maximum axial resolution) is found at the beam waist, which can be determined by measuring the central width at 0 V scan amplitude, as depicted in panels (C) for the Olympus 60×NA 1.0 detection lens and (D) Olympus 10×NA 0.3 detection lens. The resulting beam waist of 1.7 µm is identical since the same excitation lens was used (Nikon 10×NA 0.3). To evaluate imaging performance of the sideSPIM setup in a hydrogel, they prepared a sample with green fluorescent spheres of 1 µm diameter (yellow-green Fluorospheres, Invitrogen) dispersed in a 1% agarose hydrogel. Three dimensional stacks were acquired by imaging 512 planes at a distance of 270 nm with the Olympus 60×NA 1.0 detection lens. The Y projection is shown in FIG. 13 for epi-illumination (A) as well as with light sheet illumination (B). As expected for epi-illumination there is no optical sectioning. Instead, with light sheet excitation the individual beads are clearly visible. Since the light sheet was formed with a Gaussian beam, the axial resolution diminishes towards the periphery of the light sheet.

With Index Matching:

To verify that optical aberrations are minimal after introduction of the resin to match the refractive index, the inventors coated a piece of 1 mm thick resin with the fluorescent dye Rhodamine 110 and subjected it to SPIM imaging with side illumination. They acquired z-stacks with epi-illumination as well as light sheet illumination. The results are shown in FIG. 14. With epi-illumination no z-sectioning is obtained. With SPIM, however, the Rhodamine 110 layer is clearly visible. A full width at half maximum of 1.6 µm can be achieved with an excitation lens NA of 0.3. The slight background fluorescence on top of the resin comes from residual Rhodamine 110 in the water solution.

They were also able to demonstrate that the design is compatible with 2-photon excitation (FIG. 15). The top right image compares the excitation volume of the single vs the two photon excitation beam. This image was acquired with the 10× instead of the 60× detection lens to illustrate the difference in shape. With single photon excitation every fluorophore in the way of the beam gets excited, whereas with two photon excitation, excitation happens only in the very center where the intensity is high enough. The center right image shows the same layer of Rhodamine 110 as in FIG. 14 but excited with 780 nm light (60× detection lens). A FWHM of 2 µm is achieved. Again, the slight background fluorescence on top of the resin comes from residual Rhodamine 110 present in the water solution.

For a more detailed evaluation they imaged the Rhodamine 110 solution without scanning the beam along the x direction (amplitude of the scanner 0 V). Hence, the extension of the light sheet in the plane of excitation was defined by the excitation lens NA of 0.3.

Figure 25:
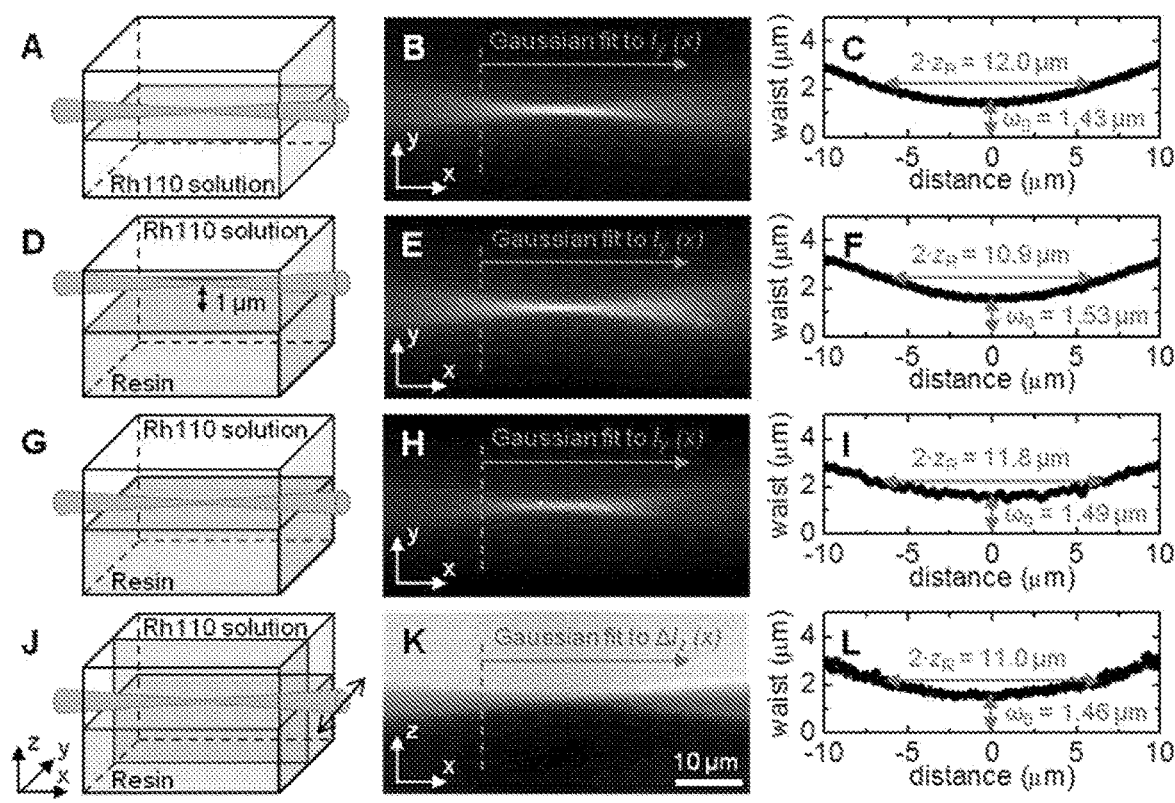
FIG. 25 depicts, in accordance with embodiments herein, an overview of results further described herein. (A) Rhodamine 110 on top of the resin without scanning of the excitation beam. (B) Fluorescence image of a single xy plane inside the Rhodamine solution without scanning and no resin in the sample well as illustrated in (A). (C) A Gaussian was fitted to the intensity distribution for each vertical line of pixels, the minimum beam waist was 1.43 µm, the confocal parameter was 12.0 µm. (E) Fluorescence image of a single xy plane inside the Rhodamine solution at a distance of 1 µm from the resin (MY-133 V2000) without scanning as shown in (D). (F) The minimum beam waist was 1.53 µm, the confocal parameter was 10.9 µm. (H) Fluorescence image of a single xy plane at the Rhodamine solution/resin interface without scanning as depicted in (G). (I) The minimum beam waist was 1.49 µm, the confocal parameter was 11.8 µm. (K) Fluorescence image of a single xz plane extracted from a z stack of the Rhodamine solution/resin interface as drawn in (J). (L) The minimum beam waist calculated from the intensity derivative was 1.46 µm, the confocal parameter was 11.0 µm.

An overview of the experiment is displayed in FIG. 25A. The xy section of the fluorescence of the Rhodamine 110 solution is shown in FIG. 25B. A Gaussian was fitted to the intensity distribution for each vertical line of pixels, the corresponding beam waist (at e-2) as a function of the distance from the focus is graphed in FIG. 25C. The minimum thickness (maximum axial resolution) was 1.43 µm while the confocal parameter (two times the Rayleigh length, zR) was measured as 12.0 µm. To prove that optical aberrations are minimal after placement of the resin for index matching, they placed a 10×10 mm2 piece of 1 mm thick resin (MY-133 V2000) into a sample chamber well and filled it with the same 100 nM solution of Rhodamine 110. They acquired images at a distance of 1 µm from the resin/Rhodamine solution interface as shown in FIG. 25D. The intensity image is shown in FIG. 25E, and the beam waist is graphed in FIG. 25F. The minimum extension was 1.53 µm, while the confocal parameter was 10.9 µm. Another image was taken at the resin/Rhodamine solution interface (FIG. 25G-I). The minimum extension was 1.49 µm, and the confocal parameter was 11.8 µm. In a homogeneous solution, the shape of the beam should be identical in the xy plane compared to the xz plane. However, this could not be the case after introduction of the resin. Hence, the inventors recorded a z stack while scanning the beam in x direction to illuminate the whole field of view near the resin/Rhodamine solution interface (FIG. 25J). A single xz plane is shown in FIG. 25K. The beam shape in xz direction was obtained by fitting a Gaussian to the derivative of the intensity distribution in each vertical line (FIG. 25L). The minimum extension was 1.46 µm, the confocal parameter was 11.0 µm. All fluorescence images of Rhodamine 110 in solution were subjected to deconvolution with the detection point spread function (PSF) using the Lucy-Richardson method (deconvlucy, Matlab R2016b). The detection PSF was modeled as a Gaussian with 0.37 µm width as experimentally determined from images of 100 nm green fluorescent beads (see next paragraph). They proceeded by layering the 1% agarose hydrogel containing green fluorescent spheres of 1 µm diameter on top of the resin mounted inside the two window sample chamber and subjected it to SPIM imaging with side illumination (single photon excitation with blue light, same imaging parameters as without the resin). A stack of 512 images at a distance of 270 nm was acquired. They were able to demonstrate that the beads are clearly visible all the way down to the surface of the resin as depicted in the y-projection of the corresponding z-stack shown in FIG. 16.

Figure 26:
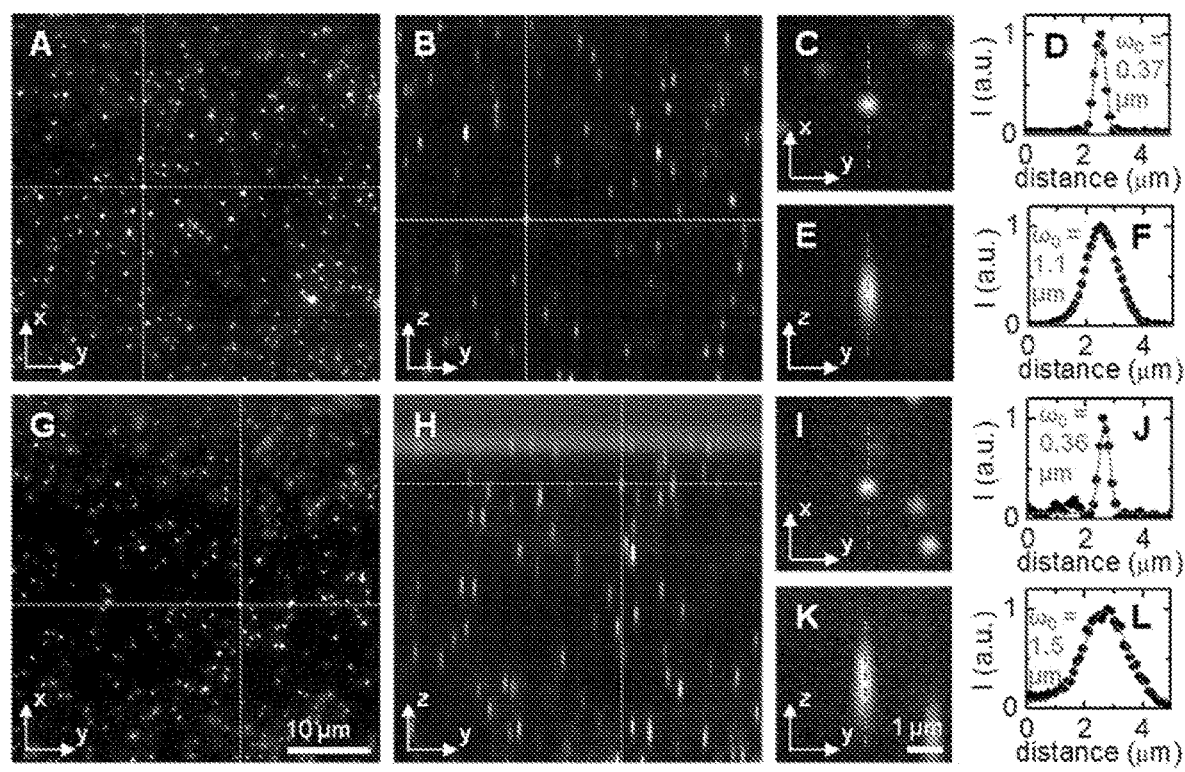
FIG. 26 depicts, in accordance with embodiments herein, light sheet evaluation with 100 nm green fluorescent beads. Single xy (A) and yz (B) plane of a stack of fluorescence images of 100 nm beads embedded in a 1% agarose hydrogel. The xy (C) and yz (D) cross sections of the PSF of a single bead (marked by the crosshair in A,B) were fitted with a Gaussian distribution (D,F) to obtain the radial and the axial waist. Single xy (G) and yz (H) plane of a stack of fluorescence images of 100 nm beads embedded in a 1% agarose hydrogel placed on top of the 1 mm thick resin (MY-133 V2000). The xy (I) and yz (K) cross sections of the PSF of a single bead (marked by the crosshair in G,H) were fitted with a Gaussian distribution (J,L) to obtain the radial and axial waist.

To better quantify these effects we prepared another sample using fluorescent beads of subdiffractional size (100 nm yellow-green Fluorospheres, Invitrogen, Thermo Fisher Scientific) dispersed in a 1% agarose hydrogel. Three dimensional stacks were recorded, single xy and yz planes are displayed in FIG. 26A,B.

Zoomed-in xy and yz images of the bead marked by the crosshairs and plots of their cross sections in y and z direction are shown in FIG. 26C-F. They characterized 10 beads, the average radial waist resulted in 0.37±0.02 µm while the average axial waist was 1.2±0.2 µm (mean±standard deviation, SD). Next, the resin was introduced to the sample chamber and topped with the same hydrogel containing 100 nm fluorescent beads. Single xy and yz planes of a z stack are displayed in FIG. 26G,H. All beads are clearly visible all the way down to the surface of the resin/hydrogel interface. Zoomed-in xy and yz images of a bead at 5 μm distance from the resin/hydrogel interface as indicated by the crosshairs and plots of the corresponding cross sections in y and z direction are shown in FIG. 26I-L. The average radial and axial waist of several beads at a distance of 0-5 μm from the resin/hydrogel interface was 0.39±0.02 μm and 1.5±0.1 μm (N=10, mean±SD). As a result, the loss in spatial resolution introduced by the resin is minimal. As expected for a Gaussian beam, the axial resolution decreases towards the periphery of the light sheet (i.e., if the field of view extends beyond the confocal parameter). Finally, they tested our design on cells grown on top of the resin that were fluorescently labeled with the membrane dye cell mask deep red. In this case, fluorescence was excited in a band of 628-638 nm and detected with a 650 nm long pass filter. A stack of 256 images at a distance of 400 nm was acquired, the resulting projection of the image stack is shown in FIG. 17.

Applications of the SideSPIM System:

Optical sectioning through plane illumination, the high frame rates possible with camera-based detection in combination with a fast piezo stage renders the system ideal for fast, three-dimensional time lapse imaging. In principle, every (plane illumination) microscope can be fitted with a fast stage for volumetric imaging. In the case of an upright/ inclined SPIM system, the imaging plane is oriented at a 45° angle with respect to the sample and stage. Hence, optical sectioning occurs at a 45° angle as well (FIG. 18 A). However, in the case of samples with a low extension in the axial direction as compared to their lateral size, such as a monolayer of cells, it is favorable to optically section the sample along the vertical direction (B). By sectioning along the vertical direction the number of planes to capture the same specimen is minimized, which in turn allows for faster imaging of a larger field of view. This is especially important when imaging multiple cells growing on the same surface as illustrated in FIG. 18 C,D. With sectioning at a 45° angle the number of planes required increases with the number of cells to be imaged. In the sideSPIM configuration, the number of planes required does not change as long as the cells are within the field of view of the camera.

Figure 27:
FIG. 27 depicts, in accordance with embodiments herein, a photograph of the two window sample chamber serving as a fluidic device.
Figure 28:
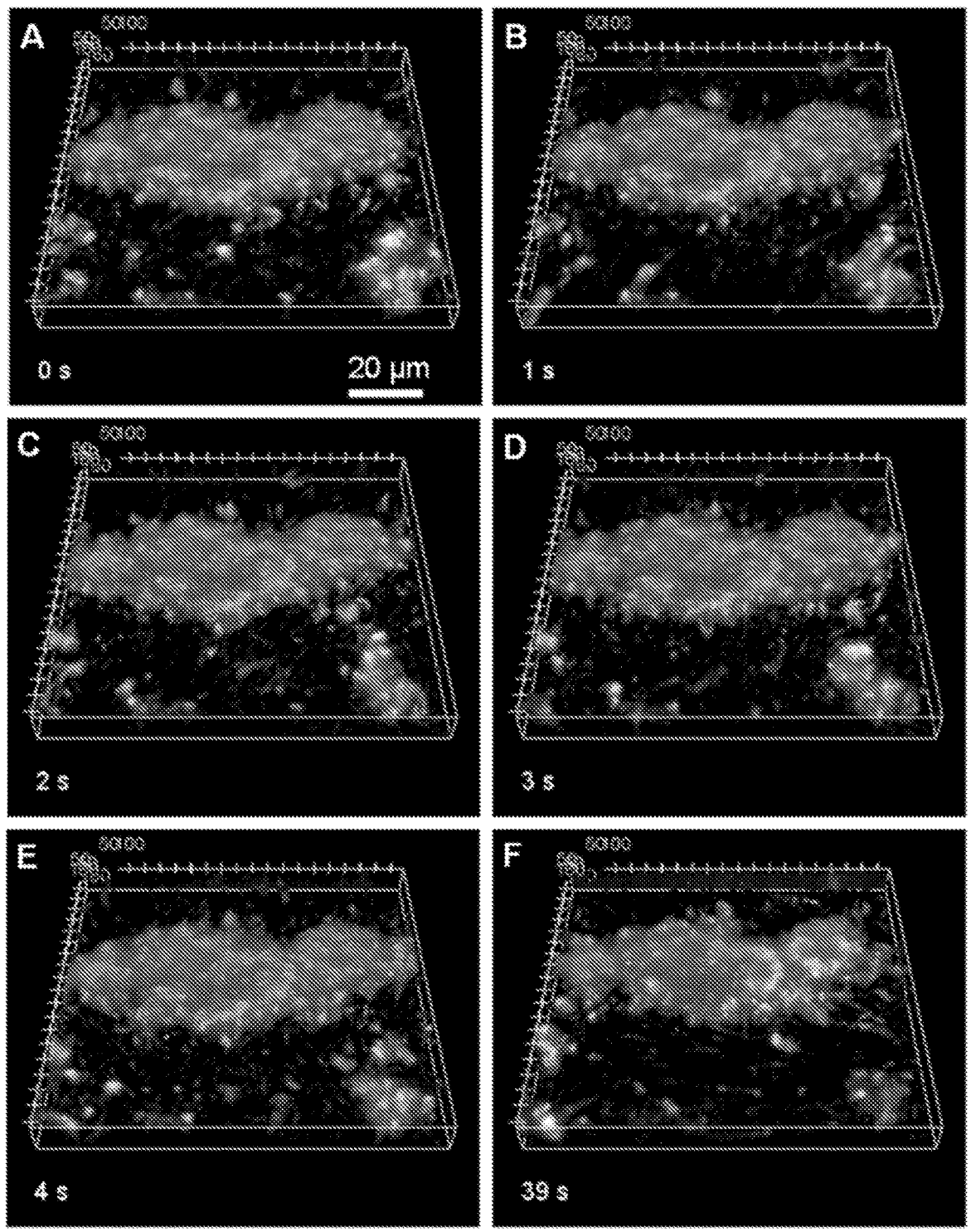
FIG. 28 depicts, in accordance with embodiments herein, a 3D reconstruction of a biofilm of AFS64 bacteria expressing EGFP on top of 1% agarose under flow at different time points.

Consequently, objects with an axial extension of a few tens of micrometers such as cells or giant vesicles can be three-dimensional imaged on the subsecond timescale. As an example, the inventors placed a 1 mm thick layer of agarose inside the well of a two window chamber and added a solution containing Pseudomonas aeruginosa AFS64 bacteria expressing EGFP. The sample chamber used for this particular experiment included an inlet on one end and an outlet on the opposing end of the well in order to be used as a fluidic device, a photograph of the chamber is shown in FIG. 27.

3D stacks of 20 planes each (500 nm z spacing) were taken at a rate of 1 stacks/s. From the time sequence it can be seen that the biofilm is very dynamic. Especially at the edges, the bacteria continuously detach from and join the film. This is an example of an experiment particularly difficult to do with most other SPIM configurations. It is almost impossible to perform an experiment involving fluidics, let alone microfluidics by dipping into the sample chamber while this is not a problem at all with the two window well chamber and the sideSPIM configuration.

Three Dimensional Imaging of GUVs of Different Lipid Compositions:

To demonstrate the capabilities of the system, they prepared giant unilamellar vesicles (GUVs) with different lipid compositions. To attach the GUVs to the resin surface the inventors used a coating protocol with biotin-bovine serum albumin (b-BSA). Briefly, the resin was coated with a solution 1% BSA and 0.1% b-BSA. The GUVs was doped with 0.1% molar of biotin-phosphatidylethanolamine (b-PE) and 0.5% molar DiIC18 (Invitrogen, GE). An electro-formation protocol was used to grow the GUVs, lipids was deposited on a platinum wire and later dry in vacuum for an hour[12]. Then, the Pt wires were connected to a function generator with 2 V p-p and 10 Hz sinusoidal function, for 1 hour above the melting transition. After 1.5 hour the sample was disconnected and allowed to decrease the temperature to room temperature. GUVs was carefully transferred to the coated chamber and immediately imaged. Fluorescence of DiIC18 was excited in a band of 465-495 nm and detected using the Olympus 60×NA 1.0 objective through a 535/50 nm band pass filter. The inventors acquired z-stacks of the three different samples at an axial spacing of 500 nm while the camera pixel size at the sample was 107 nm. The differences in lipid composition are immediately apparent from the 3D reconstructions (FIG. 19). While DOPC alone forms a homogeneous membrane (A), the ternary mixture of DOPC, DPPC and Cholesterol allows liquid phase coexistence (B). Since the dye DiIC18 has different affinities for the different phases, these can be identified as dark patches.

Mapping the Diffusion of Lipid Domains on the Surface of a GUV:

With the microscope system, the inventors were able to follow the diffusion of lipid domains in a ternary mixture that allows liquid phase coexistence (DOPC:DPPC:Cholesterol, 1:1:1) on the entire GUV as shown in the 3D renderings at different time points in FIG. 20 (the full movie is provided as an attachment). They were able to image 3D stacks of 60 planes with a step size of 500 μm at 800 ms intervals. The exposure time for a single plane was 10 ms resulting in 600 ms for all 60 planes plus a 200 ms overhead for repositioning of the piezo stage at the starting position. The domains freely diffuse on the surface of the GUV, six exemplary tracks are shown. Note that the images shown here represent only a subset of the full acquisition of 60 s length. During this time, the photobleaching was negligible. All samples were imaged at room temperature (23° C.). For image acquisition the open source microscopy software Micro Manager was used. 3D images were rendered with Fiji ImageJ.

Figure 29:
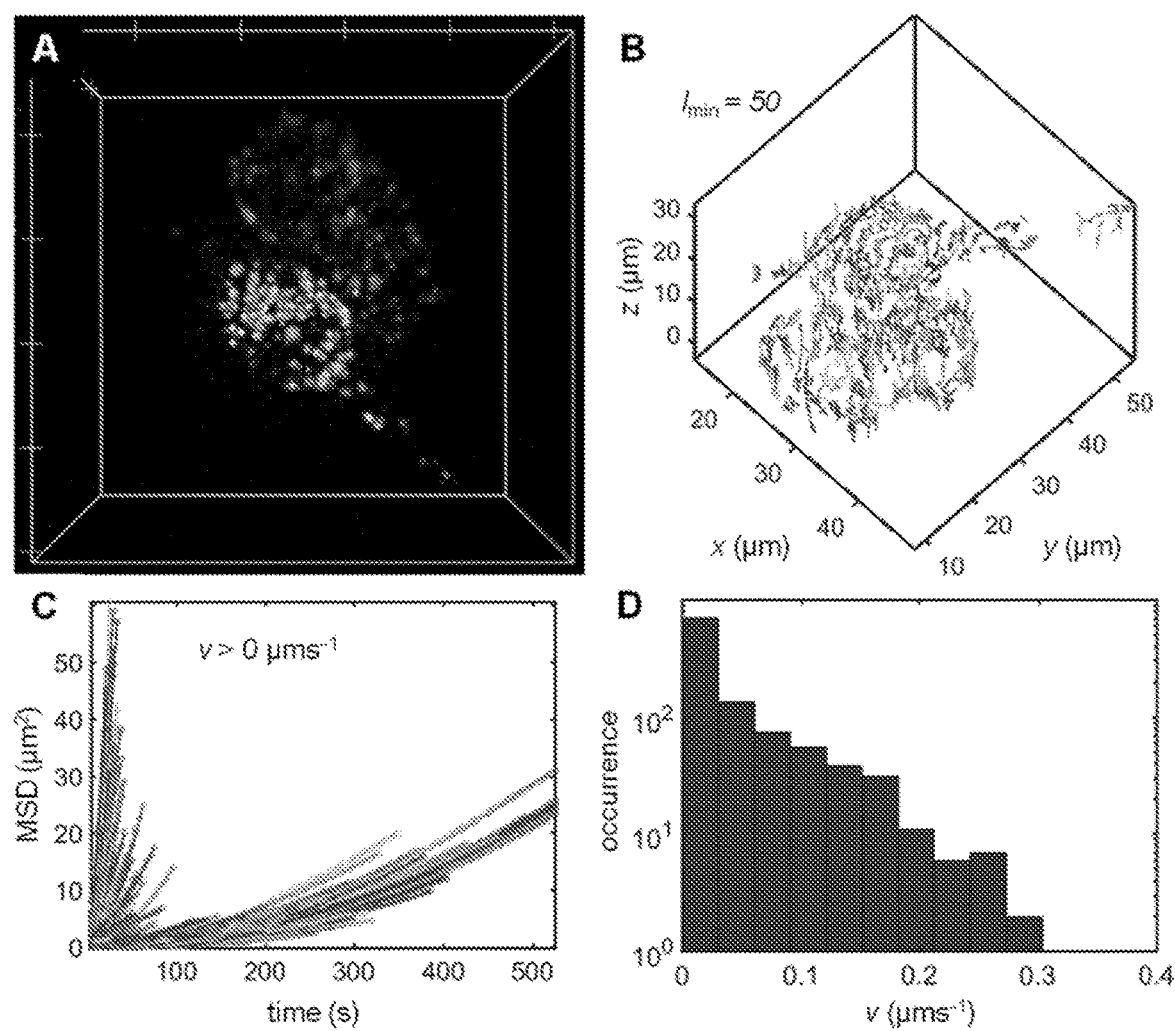
FIG. 29 depicts, in accordance with embodiments herein, three dimensional tracking. (A) 3D reconstruction of an image stack of lysosomes in A549 cells labeled with Lysotracker Red. (B) 3D trajectories of the lysosomes shown in panel A followed over 2,100 s that could be followed in a minimum of 50 consecutive stacks. (C) MSD of those tracks with a velocity >0 µms−1. (D) Histogram of the velocities of the tracks shown in panel C.

Three-Dimensional Tracking of Lysosomes in A549 Cells:

Lysosomes are small vesicles containing enzymes able to digest biomolecules. To follow lysosome dynamics in 3D, A549 cells embedded in a collagen matrix were labeled with LysoTracker Red (L7528, Thermo Fisher Scientific). Cells were incubated with a final concentration of 50 nM for 1 h at 37° C. immediately before sideSPIM imaging. Fluorescence was excited in a band of 572/15 nm and detected through a 630/69 nm band pass filter, the 3D reconstruction of a single stack is shown in FIG. 29A.

A series of 500 stacks (60 planes each with 500 nm z spacing) was taken at 4.2 s intervals for a total of 2,100 s and subjected to 3D particle tracking analysis. Sample drift was compensated by subtraction of the average displacement of all lysosomes detected. Tracks of those lysosomes that could be followed for a minimum of 20 consecutive stacks were included in the dataset for further analysis. The tracks are visualized in FIG. 29B. A minimum track length threshold of 50 consecutive stacks was applied for better visualization. All tracks were fitted with a second order polynomial. FIG. 29C shows the mean square displacement (MSD) of those tracks with velocities >0 µms−1. A histogram of the velocities found is shown in FIG. 29D. There seem to be at least two populations of velocities, the first starting from 0 µms−1, the second centered around 0.25 µms−1. The MSD for each lysosome was calculated for the entire track length, resulting in an average speed. But the data could be analyzed on a subtrajectory level to obtain a more detailed picture. In such analysis, the trajectory is thresholded for active transport by defining periods of directed motion as motion in a single direction for a certain amount of time. For particle tracking the 2D/3D particle tracker was used which is part of the MOSAIC ImageJ plugin. MSDs were calculated with a custom script written in Matlab (Mathworks, Natick, Mass., USA).

Figure 30:
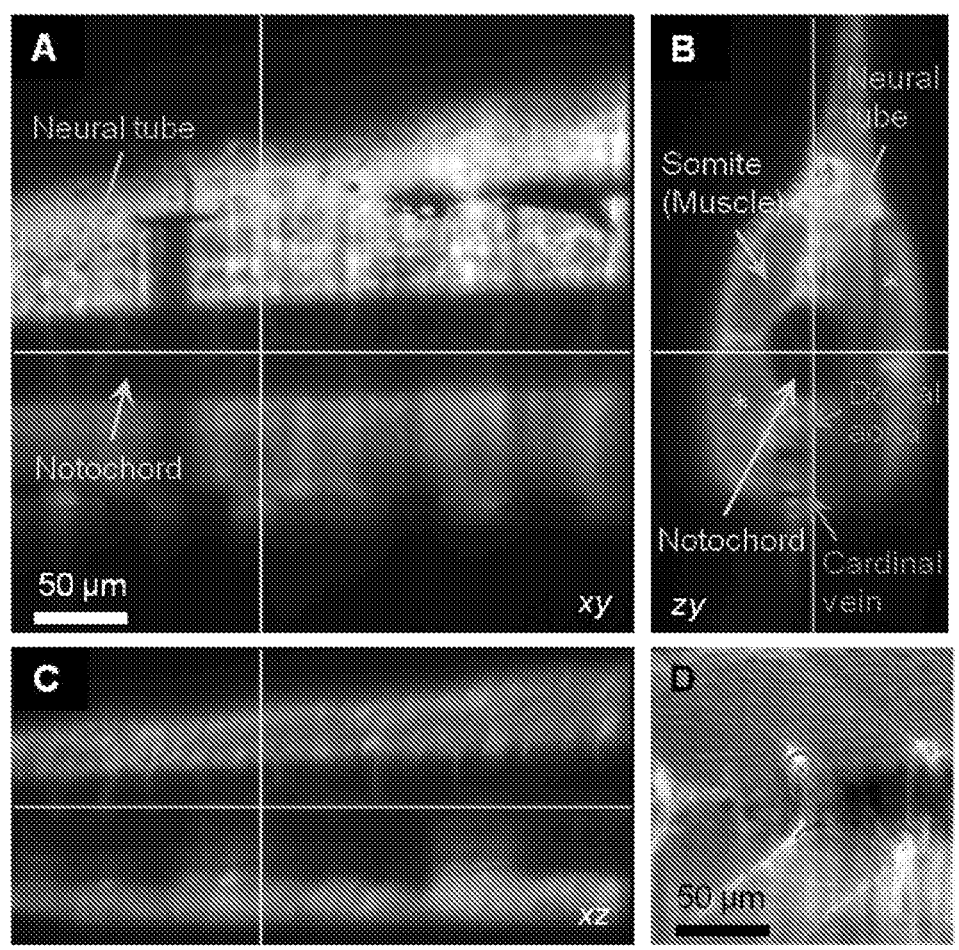
FIG. 30 depicts, in accordance with embodiments herein, fluorescence images of a zebrafish embryo labeled with Nile Red. (A-C) Single sections of an image stack of the tail section of a 36 hpf embryo. (A) xy view, (B) yz view, (C) xz view, the yellow lines indicate the position of the corresponding views. (D) Single section of an area with microcirculation, the track of a single erythrocyte is shown in red.

Zebrafish Embryo Imaging:

A 36 hours post fertilization (hpf) zebrafish embryo was fluorescently labeled by incubating for 12 hours with a zebrafish medium that contained 1 uM of the dye Nile Red. Prior to the addition of the dye the embryo was dechorionated and placed in an incubator at 28° C. The embryo was mounted in a well of our two window chamber using a 1.5% solution of agarose (low melting temperature, Sigma-Aldrich) at pH 7 for imaging. To prevent the fish from moving anesthesia consisting of 0.003% tricaine (3-amino benzoic acid ethyl ester; Sigma-Aldrich) was supplemented. The sideSPIM is able to switch between high spatial resolution imaging of single cells and imaging of whole organisms with a large field of view after minimal adjustments. Basically, a 4×0.1 NA objective (PLN4X, Olympus) was placed at the excitation side and the detection lens turret was switched to the next position containing a 40×0.8 NA water objective (LUMPLFL40×/W NA 0.8, Olympus). No further modifications in the excitation or emission paths are necessary. FIG. 30A-C shows an orthogonal view of a 3D stack of the fluorescently labeled 36 hpf zebrafish embryo.

Fluorescence was excited in a band of 572/15 nm and detected through a 630/69 nm band pass filter. From the data it is possible to easily identify structures such as the notochord, neural tube, and dorsal aorta. The dark lines are related to structures that absorb the excitation light resulting in reduced excitation of the dye behind those points. To demonstrate the high speed of our instrument for fast 3D data acquisition we recorded the microcirculation of erythrocytes in the capillary of the zebrafish embryo (see FIG. 30D for a single section). Data was acquired at 5 stacks/s of 40 planes each (1 µm z spacing), the camera frame rate was 200 frames/s. In principle, it would be possible to track and measure the flow and speed of every single erythrocyte with a simple tracking approach.

High Throughput Three-Dimensional Time Course Imaging:

The inventors redesigned our sample chamber with respect to miniaturizing the individual sample compartments. The size of each well is now 2×10×6 mm3 holding about 50-100 µl of fluid. Photographs of the chamber are shown in FIG. 21.

The sample chamber can be moved in the horizontal plane with the xy stage of the microscope, the axial direction can be scanned using the added piezo z stage. High throughput three-dimensional time lapse imaging can be performed with the following scheme. The xy stage is used to move to a volume of interest inside the first well, e.g., containing a cell. In less than a second all sections of this volume are acquired using the piezo stage. If needed, the xy stage is then used to move to other volumes of interest in the same well for subsequent 3D imaging. When all volumes of interest are imaged, the xy stage is used to move to the second well. The procedure is repeated for each well. The entire sequence is restarted after the last well. This way, multiple samples can be followed in 3D with a time resolution on the order of tens of seconds, depending on the total number of volumes of interest. This acquisition scheme is illustrated in FIG. 22.

So far, one of the most relevant applications of this arrangement could be the high throughput drug screening in the pharmaceutical industry.

Future Plans and Applications:

Imaging Bacteria Forming a Biofilm:

In one embodiment, the inventors combined sideSPIM imaging with a microfluidic culture system. This platform can be used to image a biofilm growing mimicking host colonization with the goal to observe differences between the exterior and interior bacteria cells. With conventional microscopy methods, imaging of such biofilms has remained challenging. The lack of temporal resolution of laser scanning confocal microscopy and the lack of optical sectioning in widefield epi-fluorescence microscopy, combined with the phototoxicity of both methods can be avoided by using sideSPIM. From the 3D time lapse acquisitions, one can then quantify the growth and formation of the biofilm and study its role in protecting and promoting bacteria during host colonization.

Multichannel Detection:

For many samples it is desirable to be able to detect fluorescence in multiple channels, separated for example by color, such that two fluorophores of different emission spectra can be imaged simultaneously. In one embodiment, one can split the fluorescence into four channels, separated by two colors and the two orthogonal polarizations. As an example of multiple-channel detection, one can apply the four channels detection to study the dynamic of cellular membranes using LAURDAN fluorescence. This dye was largely used to study de polarity of the membrane in vitro and in cellulo experiments. Based on a spectral shift driven by the change in the membrane polarity it is possible to study the organization of the membrane. Besides, the changes in polarity are correlated to changes in membrane viscosity, usually, evaluate by anisotropy measurements. Anisotropy measurements are difficult in regular confocal microscopy, however, are simpler in the SPIM configuration by the optic arrangement. In one embodiment, one can collect to color channels (by a band pass filter) and measure the anisotropy at the same time, by the addition polarizers to get parallel and perpendicular to emission respect to the excitation. This approach allows one to simultaneously measure the spectral shift and anisotropy, pixel by pixel, with ultrafast parallel acquisition using the camera detection. The acquisition of the polarity and viscosity simultaneously with unprecedented temporal and spatial resolution should allow better compression in the complex dynamic of the cellular membranes.

Figure 23:
FIG. 23 depicts, in accordance with embodiments herein, one embodiment of a FLIM camera.

Fluorescence Lifetime Imaging:

Recently, CMOS camera technology has be adopted to measure luminescence decays such as fluorescence lifetimes (pco.flim, PCO). The only requirement is synchronization of the camera to a modulated or pulsed light source. Both the lasers used in our sideSPIM prototype are pulsed, the white laser at 20 MHz and the Ti:Sa laser at 80 MHz. The FLIM camera mentioned earlier is present at the Laboratory for Fluorescence Dynamics as of Jan. 31, 2017 (see FIG. 23).

Since the right side port of the Olympus IX71 body used in the sideSPIM system is still available, we plan to install the FLIM camera there in the near future. This will allows one to perform 3D FLIM imaging with unprecedented speed and minimal photobleaching. In combination with two photon excitation this can be used for video-rate label-free imaging of, for example, NADH in live cells and tissues.

In one embodiment, the present invention combines the benefits of the SPIM designs described in section 1 while avoiding the drawbacks of the individual methods. In accordance with various embodiments herein, one is able to image thick samples such as cells, tissues or small organisms embedded in a hydrogel as well as flat samples such as a monolayer of cells. No dipping into the sample container is required, it can be sealed if desired or the space can be utilized for sample support, treatment or additional monitoring. High numerical aperture lenses can be used with this design resulting in single molecule sensitivity. This allows for the application of methods involving single particle localization and tracking as well as fluorescence fluctuation techniques. The sample volume can be large or small as desired. The observation plane is parallel to the sample surface maximizing field of view for flat samples. And, since the side illumination unit as well as the sample chamber are both additions independent of the main microscope platform, SPIM capability can be added to an existing inverted microscope. Further, since the size of the individual wells can be very small as opposed to designs that require optics dipping into the sample chamber, a large number of wells can be accommodated within the same chamber to allow for automated, high throughput three-dimensional time course imaging with sideSPIM. The inventors have built a working prototype and performed several measurements to test the capabilities of design. To verify that optical aberrations are minimal after introduction of the resin to match the refractive index, they coated a piece of resin with the fluorescent dye Rhodamine 110 and subjected it to SPIM imaging with side illumination. They acquired z-stacks with epi-illumination as well as light sheet illumination. With epi-illumination no z-sectioning is obtained. With SPIM, the Rhodamine 110 layer is clearly visible. A full width at half maximum of 1.6 µm was achieved with an excitation lens NA of 0.3. So far, they built a prototype, demonstrated the principle and run experiments. They have also constructed a sample chamber with a large number of microwells arranged in a line to allow for three-dimensional time lapse imaging of multiple specimen (high throughput) with all the benefits SPIM provides such as high speed and minimal photobleaching.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps, some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art. Among these variations, without limitation, are the selection of constituent modules for the inventive compositions, and the diseases and other clinical conditions that may be diagnosed, prognosed or treated therewith. Various embodiments of the invention can specifically include or exclude any of these variations or elements.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a," "an," and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

What is claimed is:

1. A sample imaging device comprising:
   a side illumination unit including a laser source and optics to convert a collimated beam of the laser source into a light sheet;
   a two-window sample chamber defining a sample well and having a first window to receive the light sheet and a second window for a detector lens, wherein the windows are arranged with respect to the side illumination unit and the detector such that the light sheet is directed into the chamber in the focal plane of the detector lens;
   an optically transparent sample holder in the sample well;
   sample immersion fluid in the sample well; and
   a refractive index matching of a refractive index of material of the sample holder and the sample immersion fluid.

2. The device of claim 1, wherein the laser source is configured to generate light sheet illumination on a sample mounted on the sample holder.

3. The device of claim 1, wherein the first window and second window comprise two optically transparent windows that are arranged perpendicular to each other.

4. The device of claim 1, wherein the sample holder comprises a magnetic attachment configured to provide reproducible mounting of a sample.

5. The device of claim 1, wherein the sample holder comprises a UV curable resin substrate, polymer substrate or hydrogel substrate.

6. The device of claim 1, wherein the sample holder is configured for imaging of a flat sample such as a monolayer of cells.

7. The device of claim 1, operatively coupled to a microfluidic device.

8. The device of claim 1, operatively coupled to a high throughput 3D device capable of imaging multiple samples.

9. The device of claim 1, comprising: a microscope arranged to image a sample on the sample holder.

10. The device of claim 9, wherein the sample holder is configured to hold cells, tissues, or small organisms, or cells, tissues, or small organisms embedded in a hydrogel.

11. The device of claim 9, wherein the sample holder is configured to mount a monolayer of cells.

12. The device of claim 9, further comprising a fluorescence component capable of fluorescence lifetime measurements.

13. The device of claim 9, wherein the two window sample chamber comprises two optically transparent windows perpendicular to each other.

14. The device of claim 9, wherein the two window sample chamber further comprises a magnetic attachment for mounting of a sample.

15. The device of claim 9, wherein the sample holder comprises an optically transparent material with a refractive index identical to the sample immersion fluid.

16. The device of claim 9, wherein the microscope is arranged on an observation plane parallel to the sample surface, maximizing field of view for flat samples.

17. The device of claim 9, wherein the microscope comprises an inverted or standard research microscope.

18. The device of claim 9, operatively coupled to a microfluidic device.

* * * * *